(12) United States Patent
Daeges et al.

(10) Patent No.: US 9,524,615 B2
(45) Date of Patent: Dec. 20, 2016

(54) GAMING SYSTEMS AND METHOD PROVIDING GAME WITH MULTIDIRECTIONAL SPINNING SYMBOL DISPLAYS

(75) Inventors: Jib I. Daeges, Reno, NV (US); Bryan D. Wolf, Reno, NV (US); Dorothy Cheung, Reno, NV (US)

(73) Assignee: IGT, Las Vegas, NV (US)

( * ) Notice: Subject to any disclaimer, the term of this patent is extended or adjusted under 35 U.S.C. 154(b) by 691 days.

(21) Appl. No.: 13/474,528

(22) Filed: May 17, 2012

(65) Prior Publication Data

US 2013/0310134 A1    Nov. 21, 2013

(51) Int. Cl.
G07F 17/32 (2006.01)
A63F 13/00 (2014.01)
A63F 13/80 (2014.01)
G07F 17/34 (2006.01)

(52) U.S. Cl.
CPC ......... *G07F 17/3262* (2013.01); *A63F 13/005* (2013.01); *G07F 17/3213* (2013.01); *A63F 13/80* (2014.09); *A63F 2300/8064* (2013.01); *G07F 17/34* (2013.01)

(58) Field of Classification Search
CPC ...... G07F 17/32; G07F 17/3213; G07F 17/34; G07F 17/3244; G07F 17/3262
USPC .................. 463/17–22, 42, 25, 26
See application file for complete search history.

(56) References Cited

U.S. PATENT DOCUMENTS

| | | | |
|---|---|---|---|
| 1,540,288 A | 6/1925 | Schallis | |
| 1,940,500 A | 12/1933 | Lawrence | |
| 2,219,154 A | 10/1940 | Wahlberg | |
| 2,301,506 A | 11/1942 | Bean | |
| 2,545,644 A | 3/1951 | Benton et al. | |
| 2,794,644 A | 6/1957 | Johnson | |
| 3,135,063 A | 6/1964 | Szabo et al. | |
| 3,149,430 A | 9/1964 | Szabo et al. | |
| 3,486,261 A | 12/1969 | Hardesty | |
| 3,610,918 A | 10/1971 | Barlow | |
| 3,655,197 A | 4/1972 | Milbaum | |
| 3,762,086 A | 10/1973 | Horbinski | |

(Continued)

FOREIGN PATENT DOCUMENTS

| | | |
|---|---|---|
| DE | 8710757 | 11/1987 |
| DE | 19600787 | 5/1997 |

(Continued)

*Primary Examiner* — Omkar Deodhar
*Assistant Examiner* — Shauna-Kay Hall
(74) *Attorney, Agent, or Firm* — Neal, Gerber & Eisenberg LLP

(57) ABSTRACT

A gaming system and method which displays a plurality of symbol displays having symbol sets distributed about circumferential paths thereof. The gaming system enables the player to select one or more directions of spin or circumferential paths for the symbol displays, and then spins the symbol displays in the selected direction(s) or along the selected circumferential paths. After the gaming system stops the spinning, each symbol display displays at least one randomly generated symbol of the symbol set extending along the circumferential path of that symbol display which corresponds to the direction of spin of that symbol display. The gaming system evaluates the displayed symbols for any winning combinations. The gaming system provides the player any awards associated with the displayed winning combinations.

21 Claims, 21 Drawing Sheets

(56) References Cited

U.S. PATENT DOCUMENTS

| | | |
|---|---|---|
| 3,838,858 A | 10/1974 | Tummescheit |
| 3,865,368 A | 2/1975 | Grazebrook |
| 3,975,022 A | 8/1976 | Figueroa |
| 4,077,631 A | 3/1978 | Tela, Sr. |
| 4,175,345 A | 11/1979 | Rutchik |
| 4,198,052 A | 4/1980 | Gauselmann |
| 4,213,524 A | 7/1980 | Miyashita et al. |
| 4,410,178 A | 10/1983 | Partridge |
| 4,448,419 A | 5/1984 | Telnacs |
| 4,506,890 A | 3/1985 | Murry |
| 4,560,161 A | 12/1985 | Hamano |
| 4,676,506 A | 6/1987 | Crouch |
| 4,695,053 A | 9/1987 | Vazquez, Jr. et al. |
| 4,732,386 A | 3/1988 | Rayfiel |
| 4,871,171 A | 10/1989 | Rivero |
| 4,874,173 A | 10/1989 | Kishishita |
| 5,033,744 A | 7/1991 | Bridgeman et al. |
| 5,085,436 A | 2/1992 | Bennett |
| 5,102,134 A | 4/1992 | Smyth |
| 5,102,137 A | 4/1992 | Ekiert |
| 5,108,099 A | 4/1992 | Smyth |
| 5,125,660 A | 6/1992 | Stahl |
| 5,145,175 A | 9/1992 | Gathman et al. |
| 5,152,529 A | 10/1992 | Okada |
| 5,184,821 A | 2/1993 | Korenek |
| 5,205,555 A | 4/1993 | Hamano |
| RE34,244 E | 5/1993 | Hagiwara |
| 5,209,479 A | 5/1993 | Nagao et al. |
| 5,224,708 A | 7/1993 | Gathman et al. |
| 5,249,805 A | 10/1993 | Neil et al. |
| 5,308,065 A | 5/1994 | Bridgeman et al. |
| 5,324,035 A | 6/1994 | Morris et al. |
| 5,342,047 A | 8/1994 | Heidel et al. |
| 5,356,140 A | 10/1994 | Dabrowski et al. |
| 5,360,214 A | 11/1994 | Harmen |
| 5,362,052 A | 11/1994 | Kubatsch |
| 5,364,100 A | 11/1994 | Ludlow et al. |
| 5,393,057 A | 2/1995 | Marnell, II |
| 5,393,061 A | 2/1995 | Manship et al. |
| 5,395,111 A | 3/1995 | Inoue |
| 5,449,173 A | 9/1995 | Thomas et al. |
| 5,462,277 A | 10/1995 | Takemoto |
| 5,524,898 A | 6/1996 | Pavlovic |
| 5,542,669 A | 8/1996 | Charron et al. |
| 5,560,603 A | 10/1996 | Seelig et al. |
| 5,569,084 A | 10/1996 | Nicastro et al. |
| 5,580,053 A | 12/1996 | Crouch |
| 5,584,763 A | 12/1996 | Kelly et al. |
| 5,584,764 A | 12/1996 | Inoue |
| 5,609,524 A | 3/1997 | Inoue |
| 5,611,535 A | 3/1997 | Tiberio |
| 5,636,838 A | 6/1997 | Caro |
| 5,647,798 A | 7/1997 | Falciglia |
| 5,656,838 A | 8/1997 | Shinmori |
| 5,664,998 A | 9/1997 | Seelig et al. |
| 5,697,843 A | 12/1997 | Manship et al. |
| 5,704,835 A | 1/1998 | Dietz, II |
| 5,722,891 A | 3/1998 | Inoue |
| 5,766,074 A | 6/1998 | Cannon et al. |
| 5,788,573 A | 8/1998 | Baerlocher et al. |
| 5,807,172 A | 9/1998 | Piechowiak |
| 5,823,872 A | 10/1998 | Prather et al. |
| 5,823,874 A | 10/1998 | Adams et al. |
| D400,597 S | 11/1998 | Hedrick et al. |
| D402,702 S | 12/1998 | Seelig et al. |
| 5,848,932 A | 12/1998 | Adams |
| 5,873,781 A | 2/1999 | Keane |
| D406,865 S | 3/1999 | Heidel |
| 5,882,261 A | 3/1999 | Adams |
| 5,911,418 A | 6/1999 | Adams et al. |
| 5,927,714 A | 7/1999 | Kaplan |
| 5,947,820 A | 9/1999 | Morro et al. |
| 5,976,015 A | 11/1999 | Seelig et al. |
| 5,976,016 A | 11/1999 | Moody et al. |
| 5,984,781 A | 11/1999 | Sunaga |
| 5,984,782 A | 11/1999 | Inoue |
| 5,997,401 A | 12/1999 | Crawford |
| 6,004,207 A | 12/1999 | Wilson, Jr. et al. |
| 6,015,346 A | 1/2000 | Bennett |
| 6,056,642 A | 5/2000 | Bennett |
| 6,059,658 A | 5/2000 | Mangano et al. |
| 6,086,066 A | 7/2000 | Takeuchi et al. |
| 6,089,976 A | 7/2000 | Schneider et al. |
| 6,089,977 A | 7/2000 | Bennett |
| 6,089,978 A | 7/2000 | Adams et al. |
| 6,093,102 A | 7/2000 | Bennett |
| 6,105,962 A | 8/2000 | Malavazos et al. |
| 6,113,098 A | 9/2000 | Adams |
| 6,120,378 A | 9/2000 | Moody |
| D431,843 S | 10/2000 | Seelig et al. |
| 6,142,873 A | 11/2000 | Weiss et al. |
| 6,142,874 A | 11/2000 | Kodachi et al. |
| 6,149,156 A | 11/2000 | Feola |
| 6,159,095 A | 12/2000 | Frohm et al. |
| 6,159,096 A | 12/2000 | Yoseloff |
| 6,159,097 A | 12/2000 | Gura |
| 6,159,098 A | 12/2000 | Slomiany et al. |
| 6,162,121 A | 12/2000 | Morro et al. |
| 6,168,520 B1 | 1/2001 | Baerlocher et al. |
| 6,173,955 B1 | 1/2001 | Perrie et al. |
| 6,174,234 B1 | 1/2001 | Seibert et al. |
| 6,174,235 B1 | 1/2001 | Walker et al. |
| 6,190,255 B1 | 2/2001 | Thomas et al. |
| 6,203,429 B1 | 3/2001 | Demar et al. |
| D441,031 S | 4/2001 | Seelig et al. |
| 6,213,876 B1 | 4/2001 | Moore, Jr. |
| 6,220,593 B1 | 4/2001 | Pierce et al. |
| 6,224,483 B1 | 5/2001 | Mayeroff |
| 6,227,970 B1 | 5/2001 | Shimizu et al. |
| 6,231,442 B1 | 5/2001 | Mayeroff |
| 6,234,897 B1 | 5/2001 | Frohm et al. |
| D443,313 S | 6/2001 | Brettschneider |
| 6,241,607 B1 | 6/2001 | Payne et al. |
| 6,251,013 B1 | 6/2001 | Bennett |
| 6,254,481 B1 | 7/2001 | Jaffe |
| 6,261,177 B1 | 7/2001 | Bennett |
| 6,267,669 B1 | 7/2001 | Luciano, Jr. et al. |
| 6,270,411 B1 | 8/2001 | Gura et al. |
| 6,302,790 B1 | 10/2001 | Brossard |
| 6,305,686 B1 | 10/2001 | Perrie et al. |
| 6,309,300 B1 | 10/2001 | Glavich |
| 6,315,660 B1 | 11/2001 | DeMar et al. |
| 6,315,663 B1 | 11/2001 | Sakamoto |
| 6,315,664 B1 | 11/2001 | Baerlocher et al. |
| 6,319,123 B1 | 11/2001 | Paludi |
| 6,319,124 B1 | 11/2001 | Baerlocher et al. |
| 6,322,309 B1 | 11/2001 | Thomas et al. |
| 6,334,814 B1 | 1/2002 | Adams |
| 6,336,863 B1 | 1/2002 | Baerlocher et al. |
| 6,338,678 B1 | 1/2002 | Seelig et al. |
| 6,340,158 B2 | 1/2002 | Pierce et al. |
| 6,346,043 B1 | 2/2002 | Colin et al. |
| 6,347,996 B1 | 2/2002 | Gilmore et al. |
| 6,358,146 B1 | 3/2002 | Adams |
| 6,364,766 B1 | 4/2002 | Anderson et al. |
| 6,364,767 B1 | 4/2002 | Brossard et al. |
| 6,368,216 B1 | 4/2002 | Hedrick et al. |
| 6,375,187 B1 | 4/2002 | Baerlocher |
| 6,386,974 B1 | 5/2002 | Adams |
| 6,398,218 B1 | 6/2002 | Vancura |
| 6,398,220 B1 | 6/2002 | Inoue |
| 6,413,162 B1 | 7/2002 | Baerlocher et al. |
| 6,419,579 B1 | 7/2002 | Bennett et al. |
| 6,439,995 B1 | 8/2002 | Hughs-Baird et al. |
| 6,443,837 B1 | 9/2002 | Jaffe et al. |
| 6,450,884 B1 | 9/2002 | Seelig et al. |
| 6,461,241 B1 | 10/2002 | Webb et al. |
| 6,464,582 B1 | 10/2002 | Baerlocher et al. |
| D465,531 S | 11/2002 | Luciano, Jr. et al. |
| 6,481,713 B2 | 11/2002 | Perrie et al. |
| 6,491,298 B1 | 12/2002 | Criss-Puszkiewicz et al. |
| 6,506,118 B1 | 1/2003 | Baerlocher et al. |
| 6,508,707 B2 | 1/2003 | DeMar et al. |
| D470,539 S | 2/2003 | Seelig et al. |

(56) References Cited

U.S. PATENT DOCUMENTS

| | | |
|---|---|---|
| 6,517,432 B1 | 2/2003 | Jaffe |
| 6,533,660 B2 | 3/2003 | Seelig et al. |
| 6,537,152 B2 | 3/2003 | Seelig et al. |
| 6,561,904 B2 | 5/2003 | Locke et al. |
| 6,575,830 B2 | 6/2003 | Baerlocher et al. |
| 6,582,307 B2 | 6/2003 | Webb |
| 6,599,185 B1 | 7/2003 | Kaminkow et al. |
| 6,602,135 B1 | 8/2003 | Gerrard |
| 6,602,137 B2 | 8/2003 | Kaminkow et al. |
| 6,607,437 B2 | 8/2003 | Casey et al. |
| 6,609,972 B2 | 8/2003 | Seelig et al. |
| 6,612,927 B1 | 9/2003 | Slomiany et al. |
| 6,644,663 B2 | 11/2003 | Seelig et al. |
| 6,656,043 B2 | 12/2003 | Seelig et al. |
| 6,676,511 B2 | 1/2004 | Payne et al. |
| 6,712,694 B1 | 3/2004 | Nordman |
| 6,715,756 B2 | 4/2004 | Inoue |
| 6,793,577 B1 | 9/2004 | Wilkins et al. |
| D496,968 S | 10/2004 | Baerlocher |
| 6,869,357 B2 | 3/2005 | Adams et al. |
| D504,473 S | 4/2005 | Baerlocher |
| 6,923,441 B2 | 8/2005 | Inoue |
| 6,974,129 B2 | 12/2005 | Nordman |
| 7,175,523 B2 | 2/2007 | Gilmore et al. |
| 7,217,189 B2 * | 5/2007 | Kaminkow ............... 463/20 |
| 7,331,858 B2 | 2/2008 | McComb et al. |
| 7,331,861 B2 | 2/2008 | Nordman |
| 7,371,172 B2 | 5/2008 | Inoue |
| 7,488,253 B2 | 2/2009 | Nordman et al. |
| 7,559,840 B1 * | 7/2009 | D'Avanzo ............... 463/30 |
| 7,601,061 B2 * | 10/2009 | Jackson ............... 463/20 |
| 7,806,760 B2 * | 10/2010 | Baerlocher ............... 463/16 |
| 7,922,573 B2 * | 4/2011 | Baerlocher et al. ........... 463/20 |
| 2002/0004424 A1 | 1/2002 | Nelson et al. |
| 2002/0019255 A1 | 2/2002 | Randall et al. |
| 2002/0025846 A1 | 2/2002 | Bennett et al. |
| 2002/0025849 A1 | 2/2002 | Olive |
| 2002/0042294 A1 | 4/2002 | Pau et al. |
| 2002/0055382 A1 | 5/2002 | Meyer |
| 2002/0065126 A1 | 5/2002 | Miller et al. |
| 2002/0142822 A1 | 10/2002 | Baerlocher et al. |
| 2002/0160830 A1 | 10/2002 | Stern |
| 2003/0040358 A1 | 2/2003 | Rothkranz et al. |
| 2003/0040360 A1 | 2/2003 | Kaminkow |
| 2003/0045348 A1 | 3/2003 | Palmer et al. |
| 2003/0045350 A1 | 3/2003 | Baerlocher et al. |
| 2003/0114215 A1 | 6/2003 | Adams et al. |
| 2003/0119583 A1 | 6/2003 | Kaminkow et al. |
| 2003/0162584 A1 | 8/2003 | Hughs-Baird et al. |
| 2003/0176214 A1 | 9/2003 | Burak et al. |
| 2003/0195027 A1 | 10/2003 | Baerlocher et al. |
| 2003/0220134 A1 | 11/2003 | Walker et al. |
| 2004/0000754 A1 | 1/2004 | Inoue |
| 2004/0002372 A1 | 1/2004 | Rodgers et al. |
| 2004/0053658 A1 | 3/2004 | Rothranz |
| 2004/0053659 A1 | 3/2004 | Rothkranz et al. |
| 2004/0053670 A1 | 3/2004 | Rothkranz et al. |
| 2004/0053687 A1 | 3/2004 | Nordman et al. |
| 2004/0106450 A1 | 6/2004 | Seelig et al. |
| 2004/0121840 A1 | 6/2004 | Rosander et al. |
| 2004/0180716 A1 | 9/2004 | Seelig et al. |
| 2004/0214630 A1 | 10/2004 | Mayeroff |
| 2004/0214631 A1 | 10/2004 | Devaull |
| 2005/0056996 A1 | 3/2005 | Nordman |
| 2005/0059454 A1 | 3/2005 | McComb et al. |
| 2005/0059478 A1 * | 3/2005 | Peterson et al. ............... 463/20 |
| 2005/0070353 A1 * | 3/2005 | Webb et al. ............... 463/16 |
| 2006/0160604 A1 * | 7/2006 | Aida ............... 463/20 |
| 2008/0090636 A1 * | 4/2008 | Lathrop ............... 463/20 |
| 2009/0137309 A1 | 5/2009 | Thomas |
| 2009/0227352 A1 * | 9/2009 | Yoshizawa ............... 463/20 |
| 2009/0239611 A1 * | 9/2009 | Teranishi ............... 463/20 |

FOREIGN PATENT DOCUMENTS

| | | |
|---|---|---|
| DE | 19613455 | 8/1997 |
| DE | 19936196 | 1/2001 |
| GB | 0912685 | 12/1962 |
| GB | 2098777 | 11/1982 |
| GB | 2201821 | 9/1987 |
| GB | 2322217 | 8/1998 |
| GB | 2383668 | 11/2001 |
| WO | WO 93/03464 | 2/1993 |
| WO | WO 2007/053349 | 5/2007 |

* cited by examiner

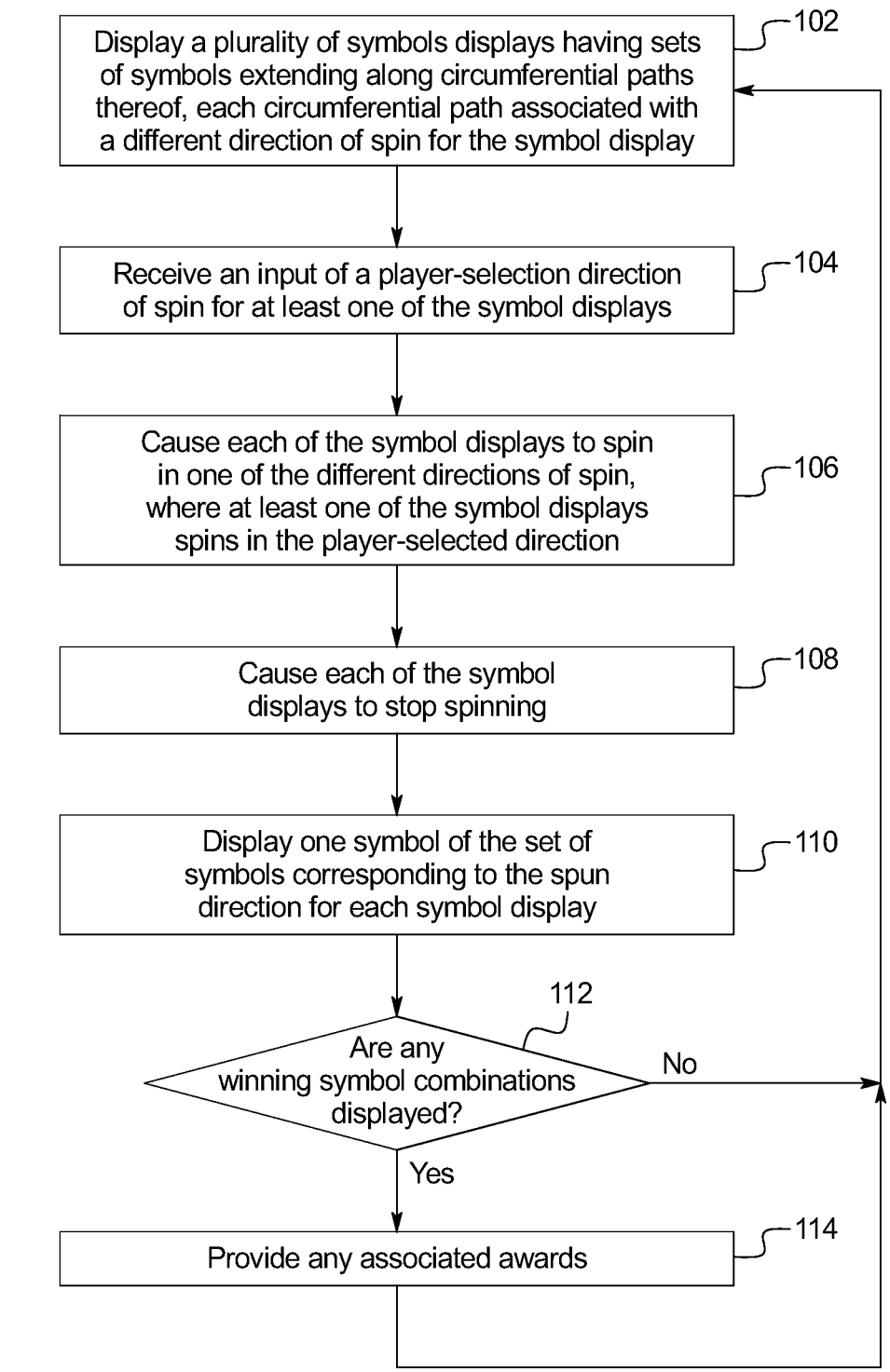

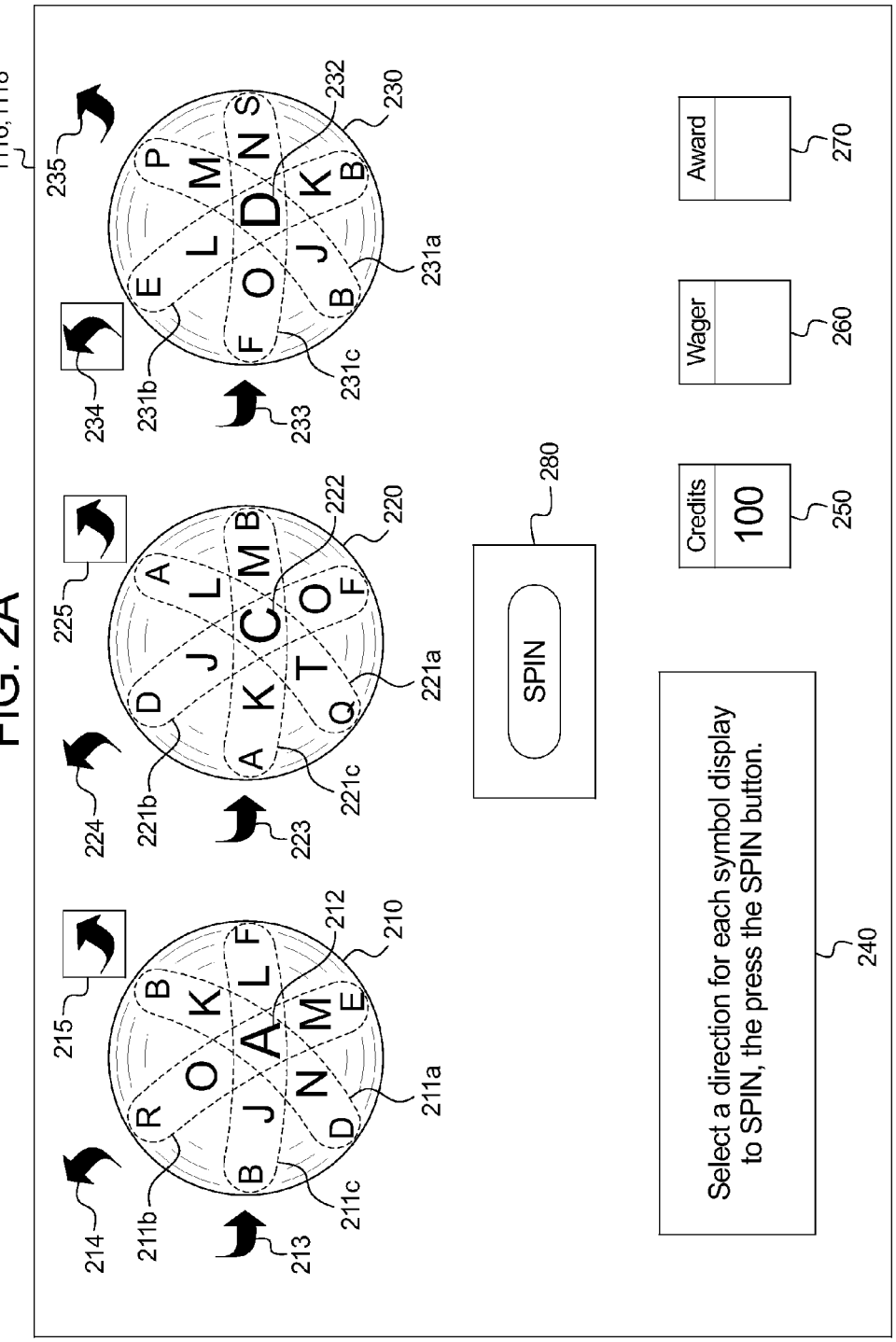

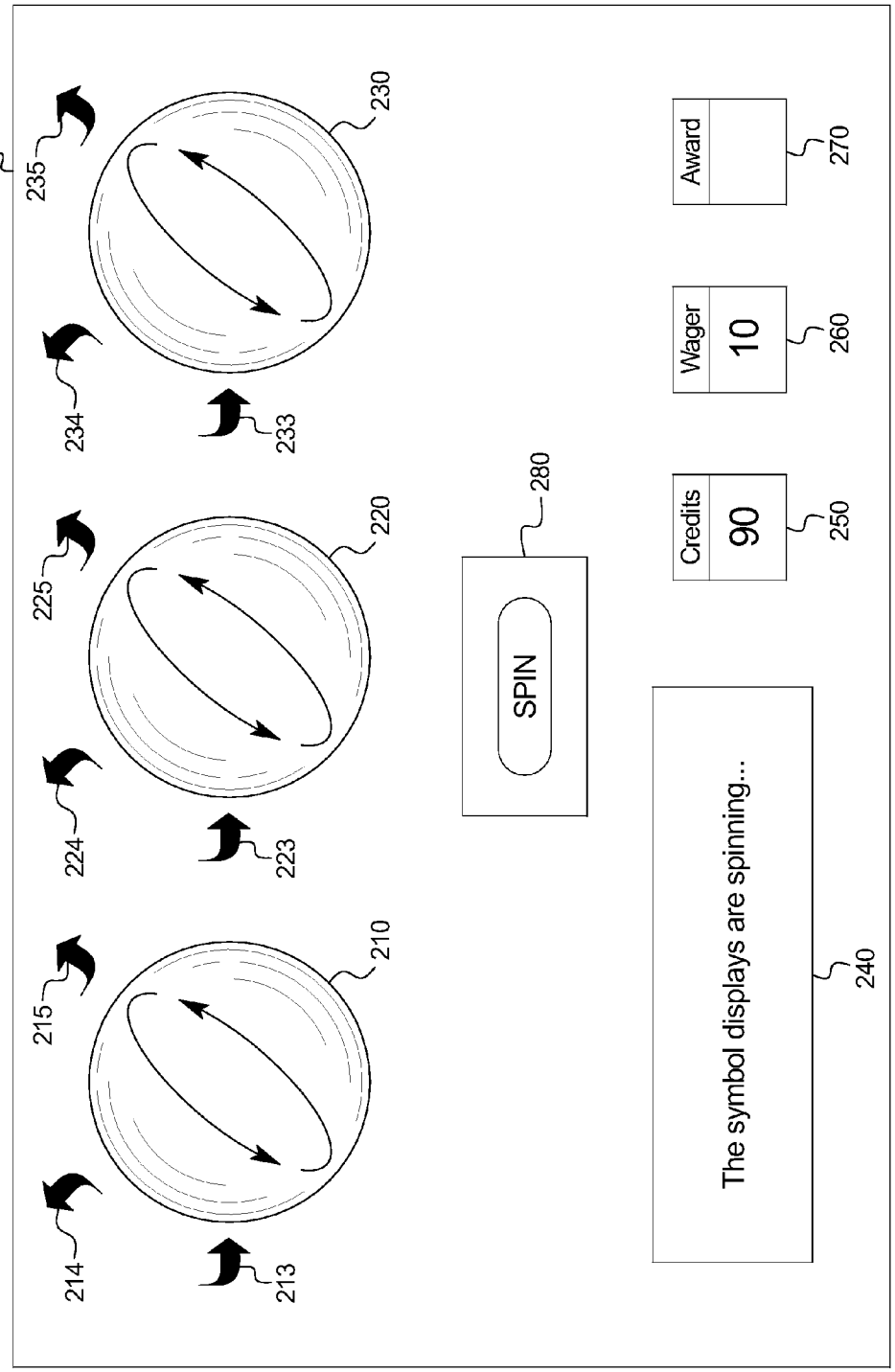

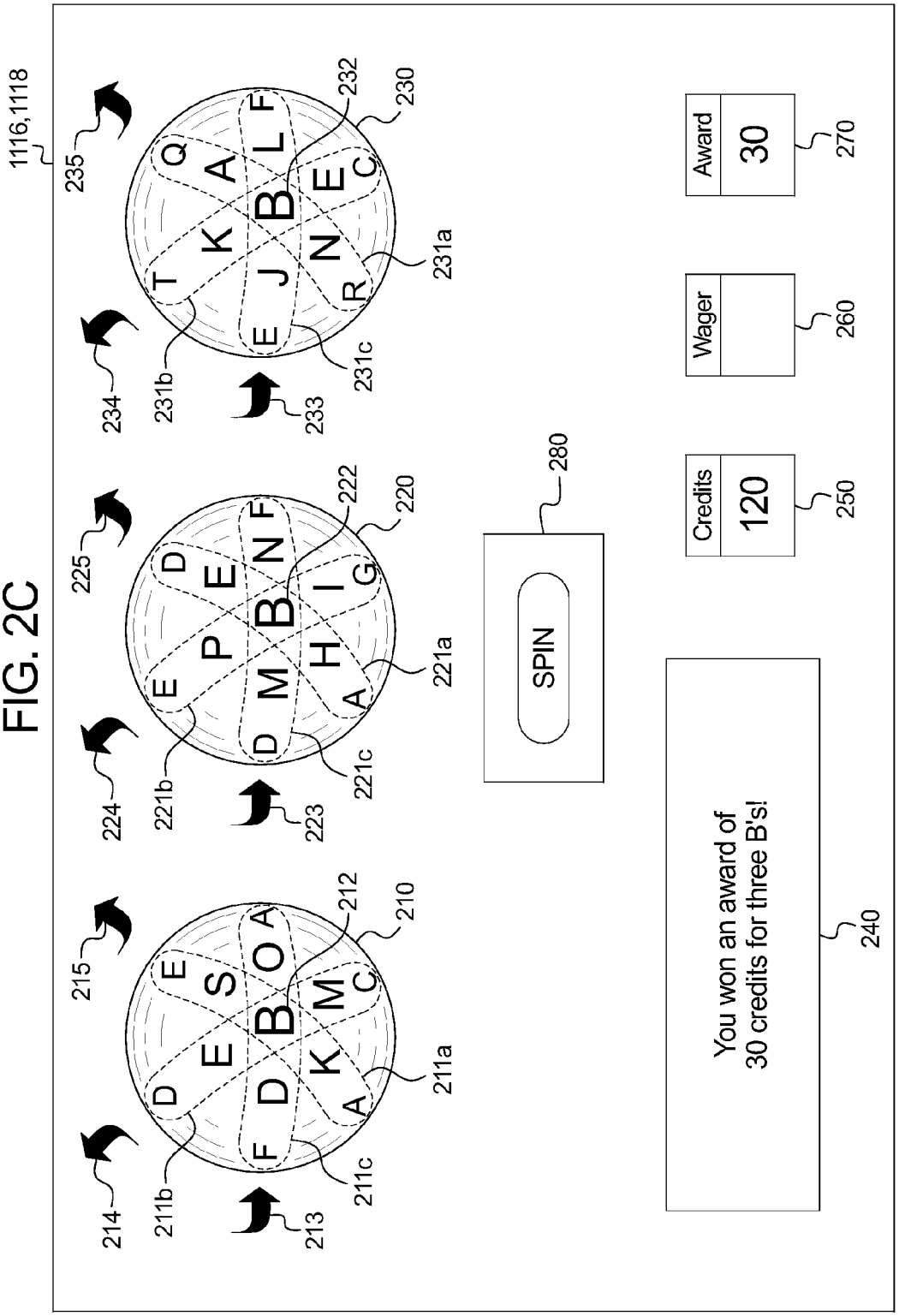

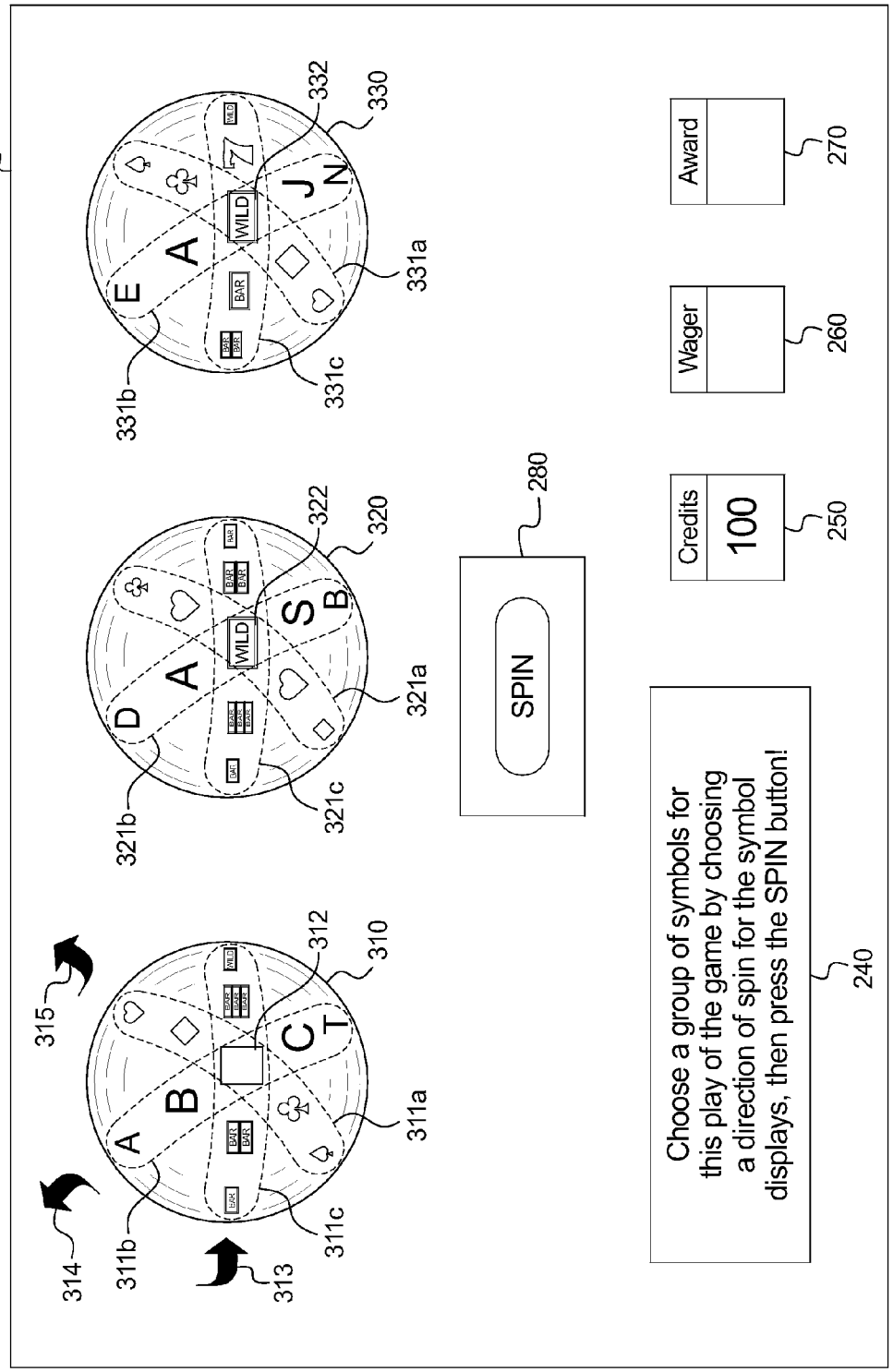

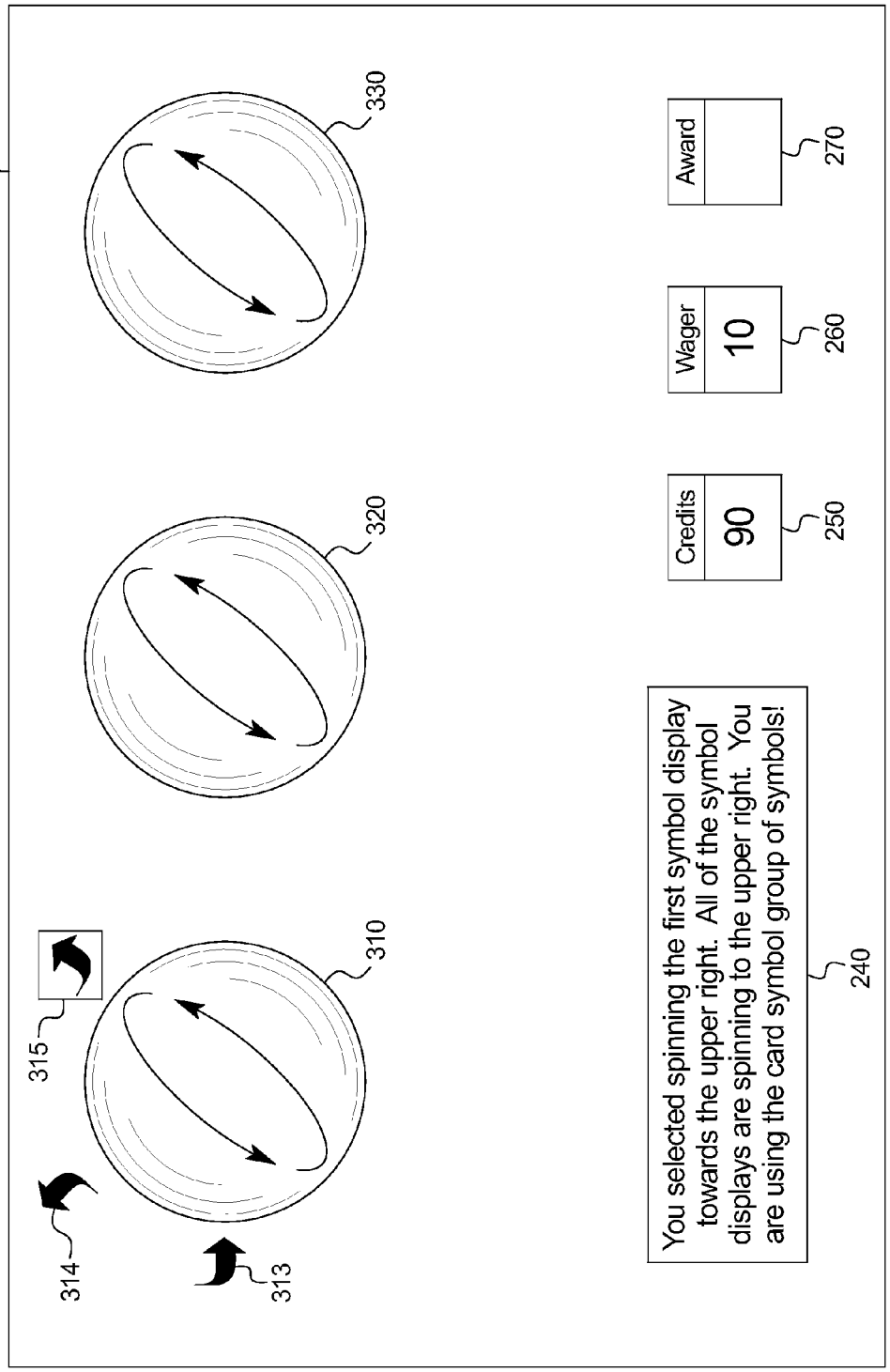

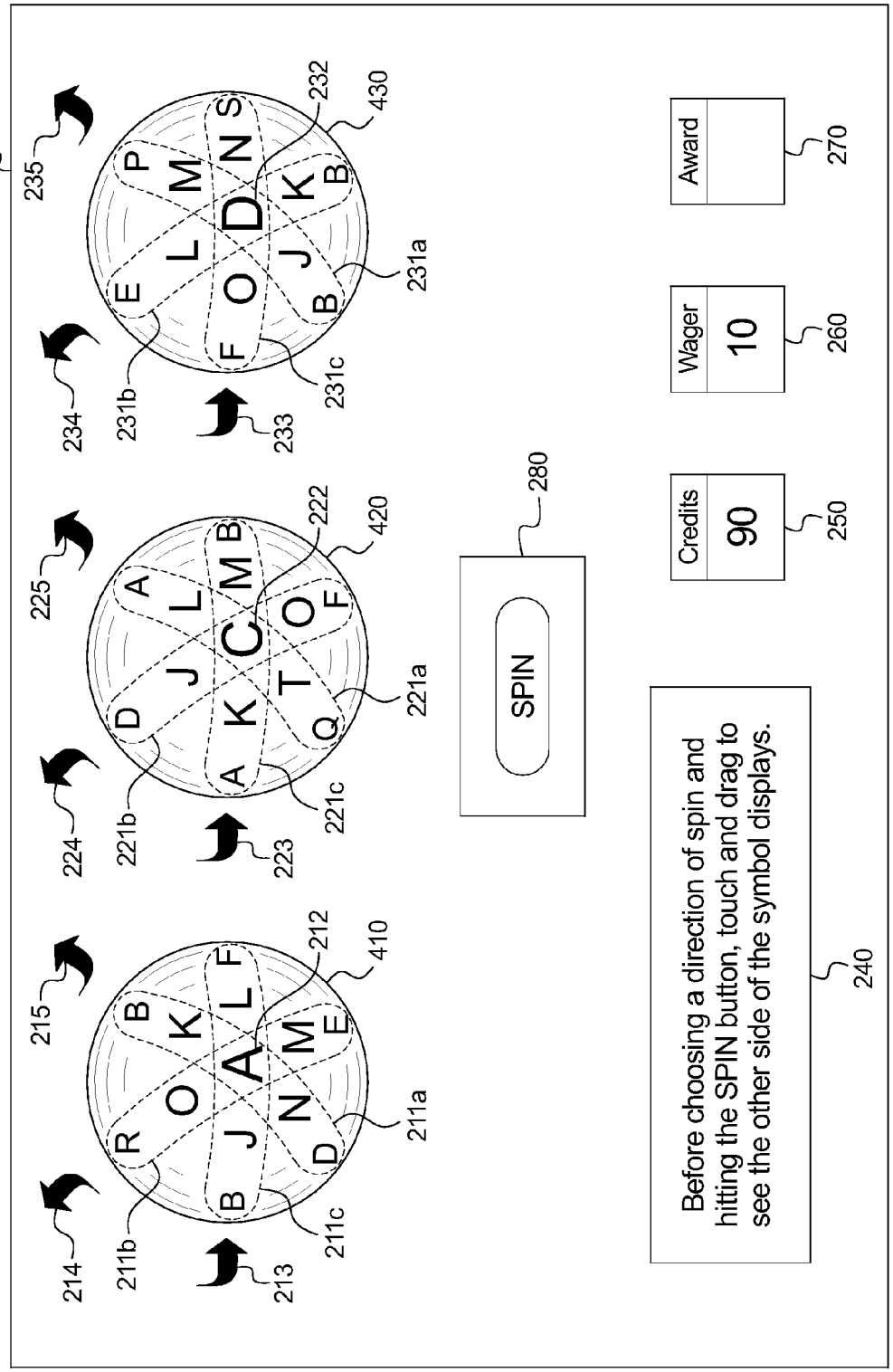

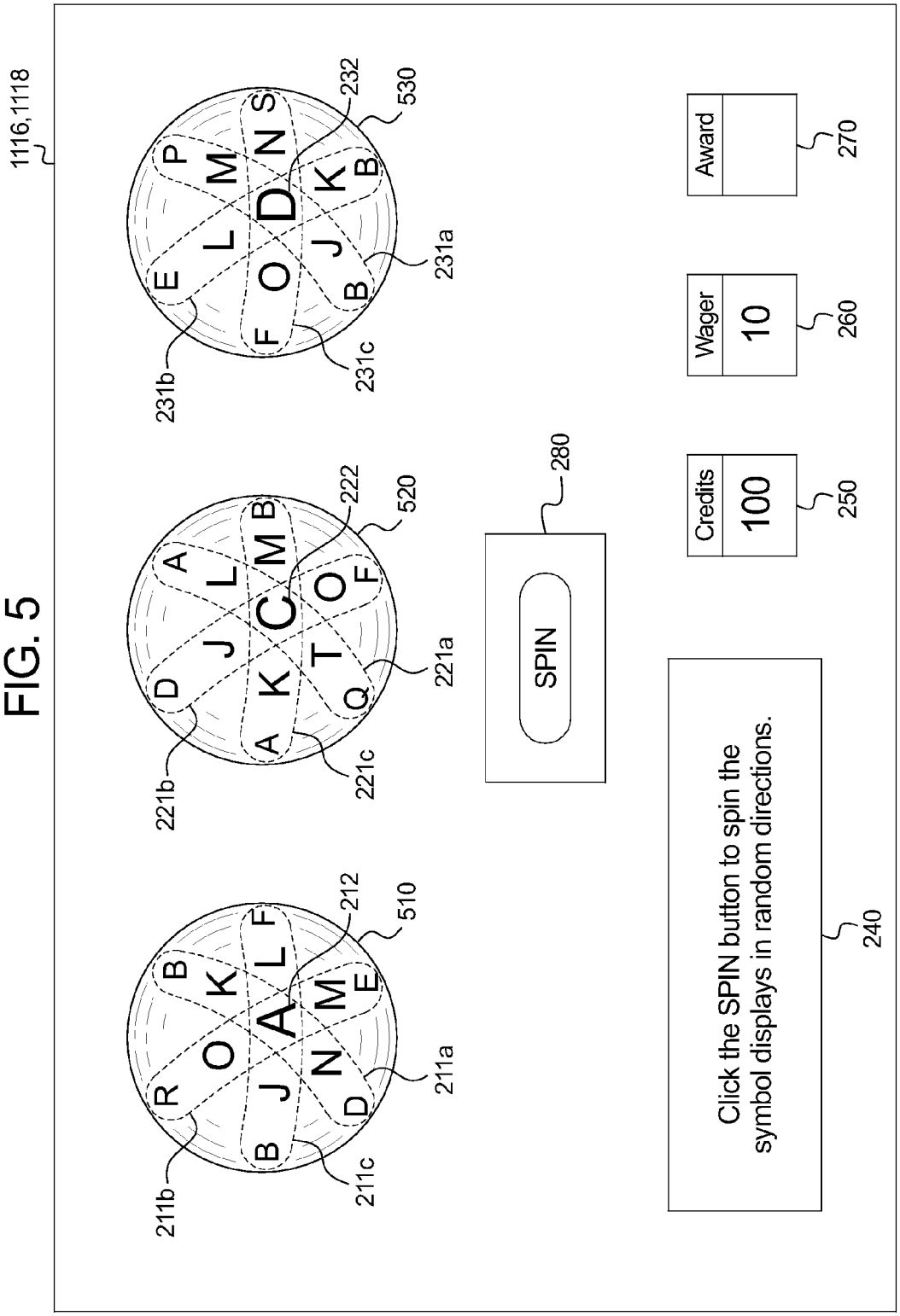

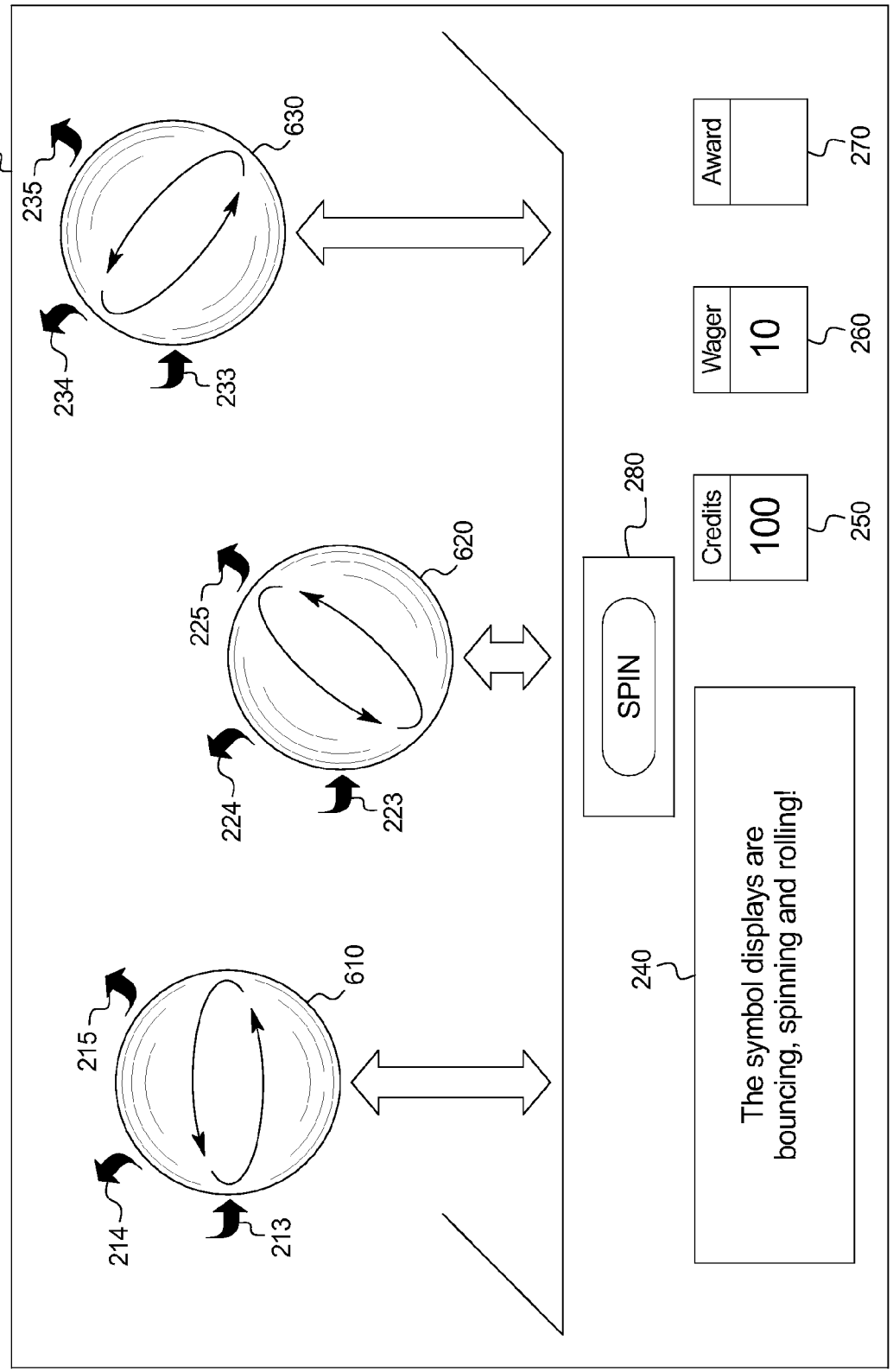

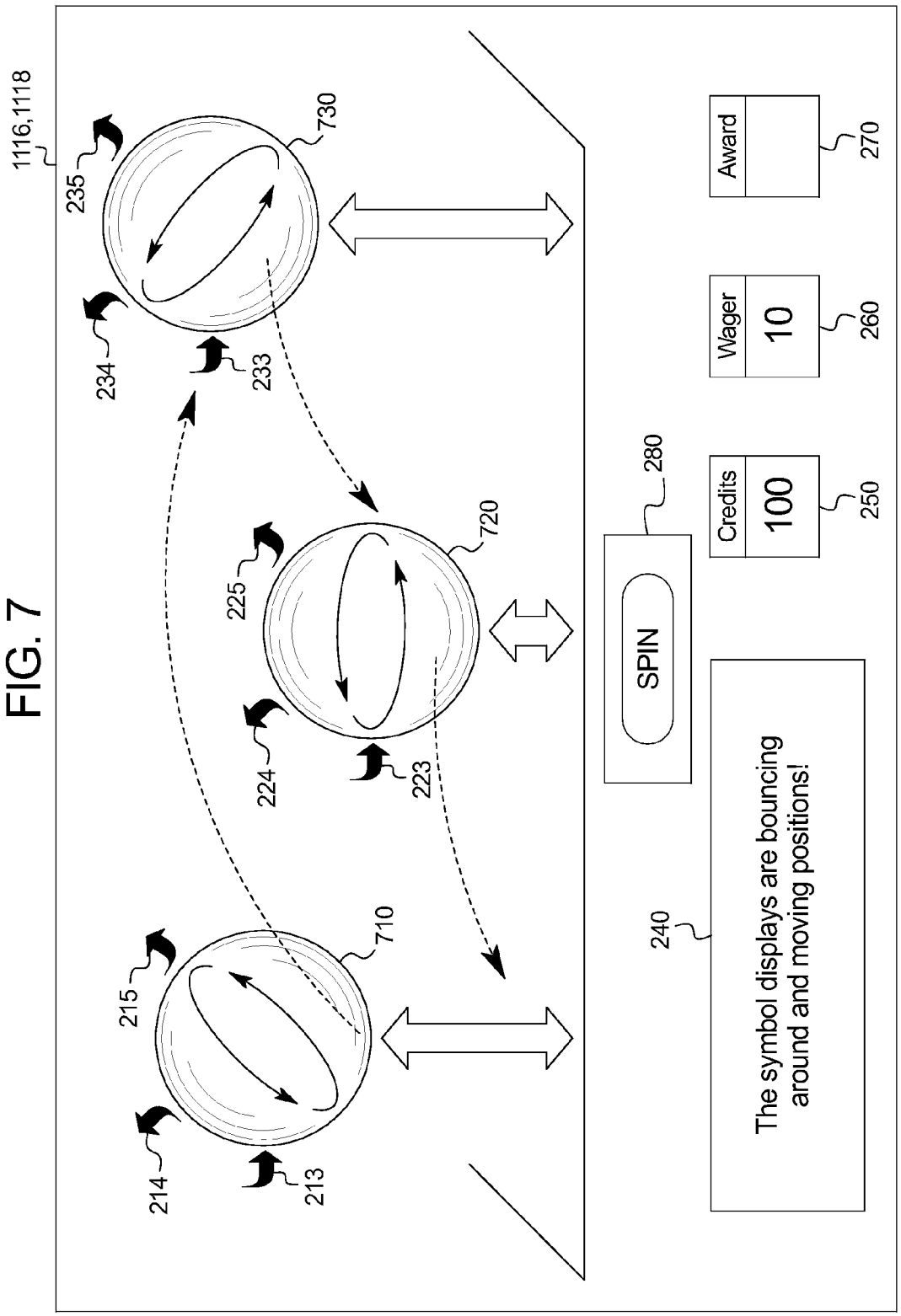

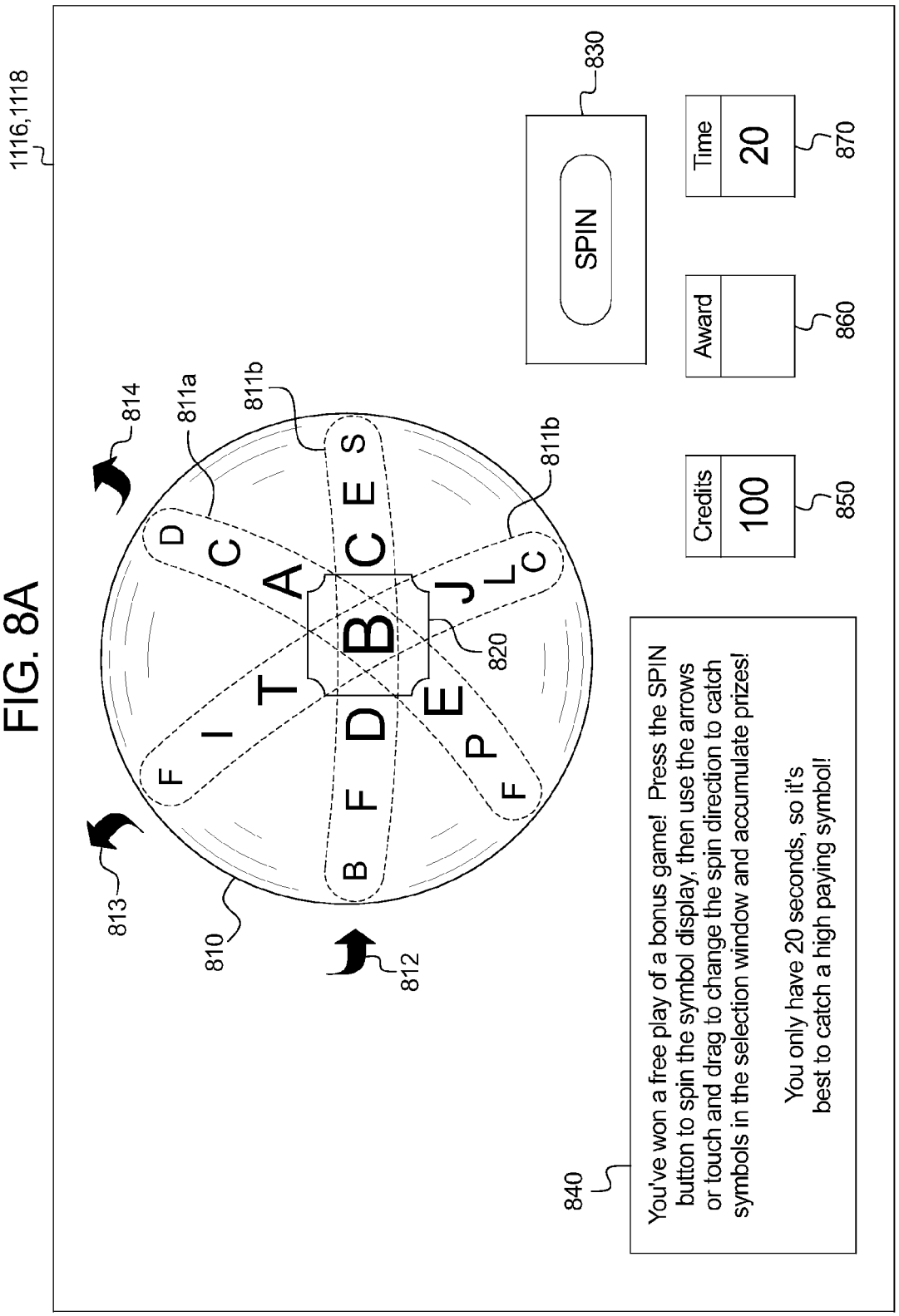

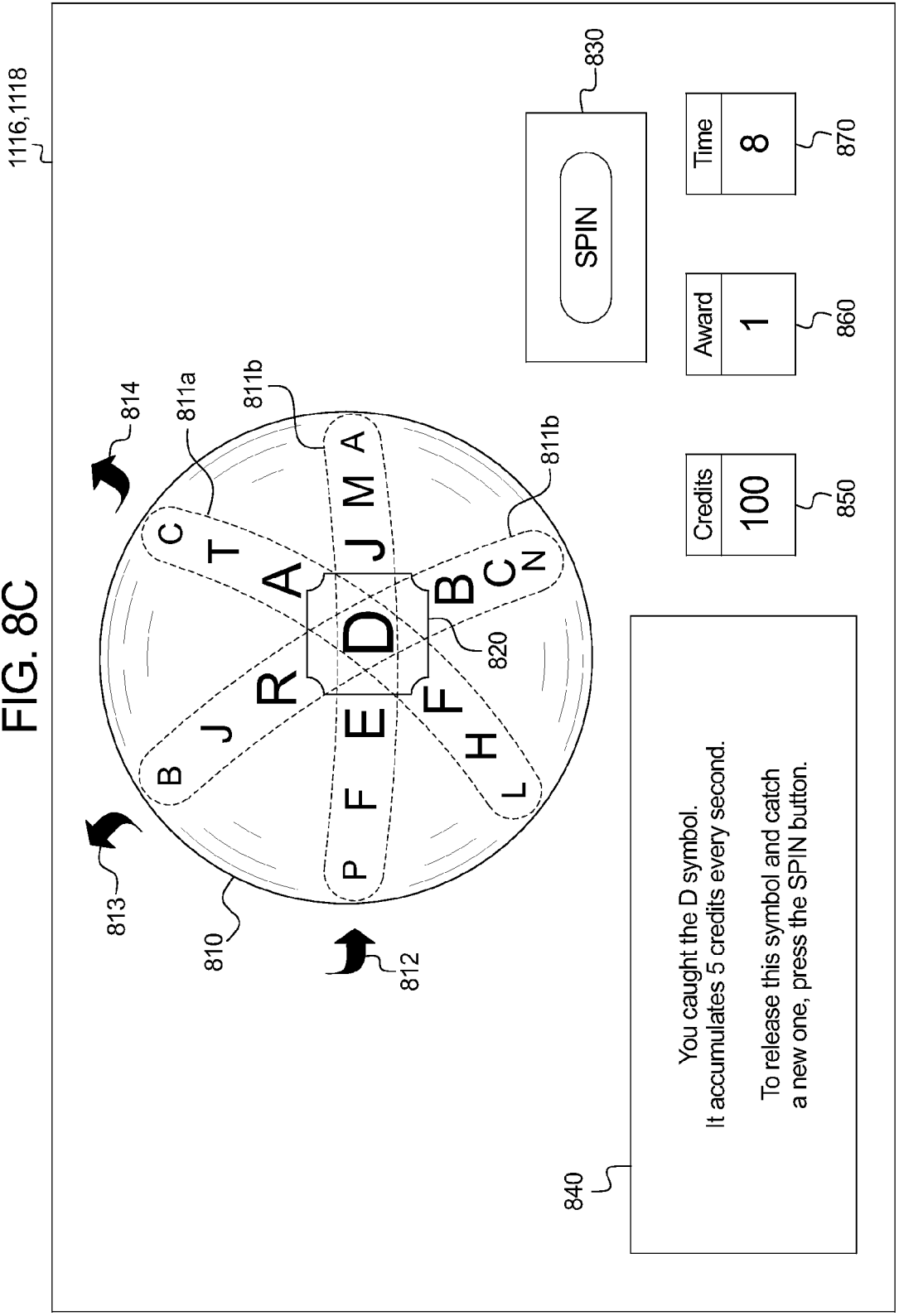

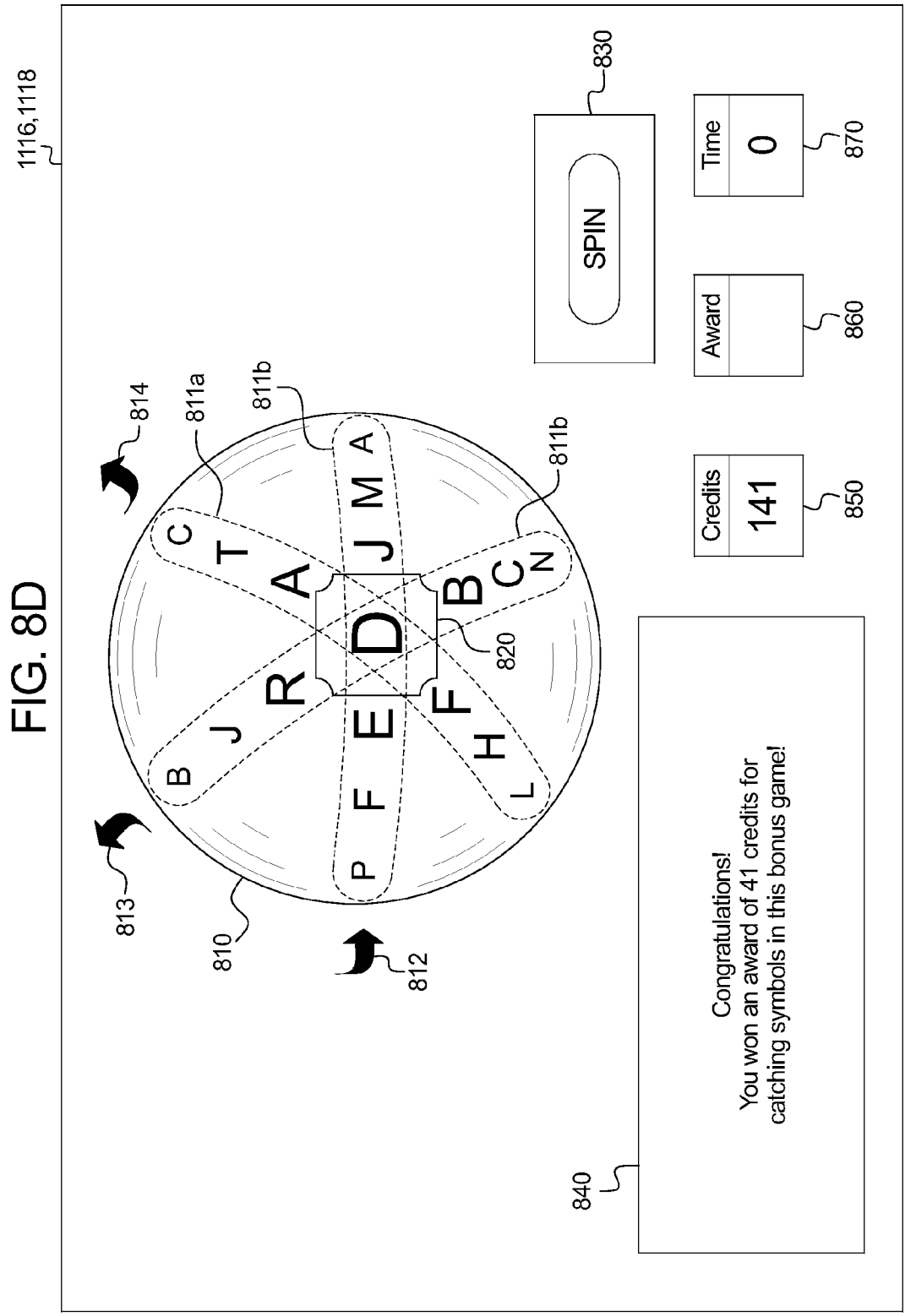

FIG. 10
| Shape | | Symbols (faces) | Spin Directions per Symbol | Sets of Symbols | Symbols per Set |
|---|---|---|---|---|---|
| 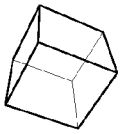 | Cube 1001a | 6 1002a | 2 1003a | 3 1004a | 4 1005a |
| 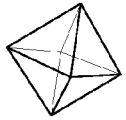 | Octahedron 1001b | 8 1002b | 3 1003b | 4 1004b | 6 1005b |
| 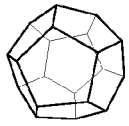 | Dodecahedron 1001c | 12 1002c | 5 1003c | 10 1004c | 6 1005c |
| 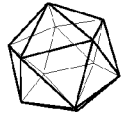 | Icosahedron 1001d | 20 1002d | 3 1003d | 6 1004d | 6 1005d |
| 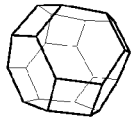 | Truncated Octahedron 1001e | 14 1002e | Square faces - 2 Hexagonal faces - 3 1003e | 14 1004e | 14 1005e |

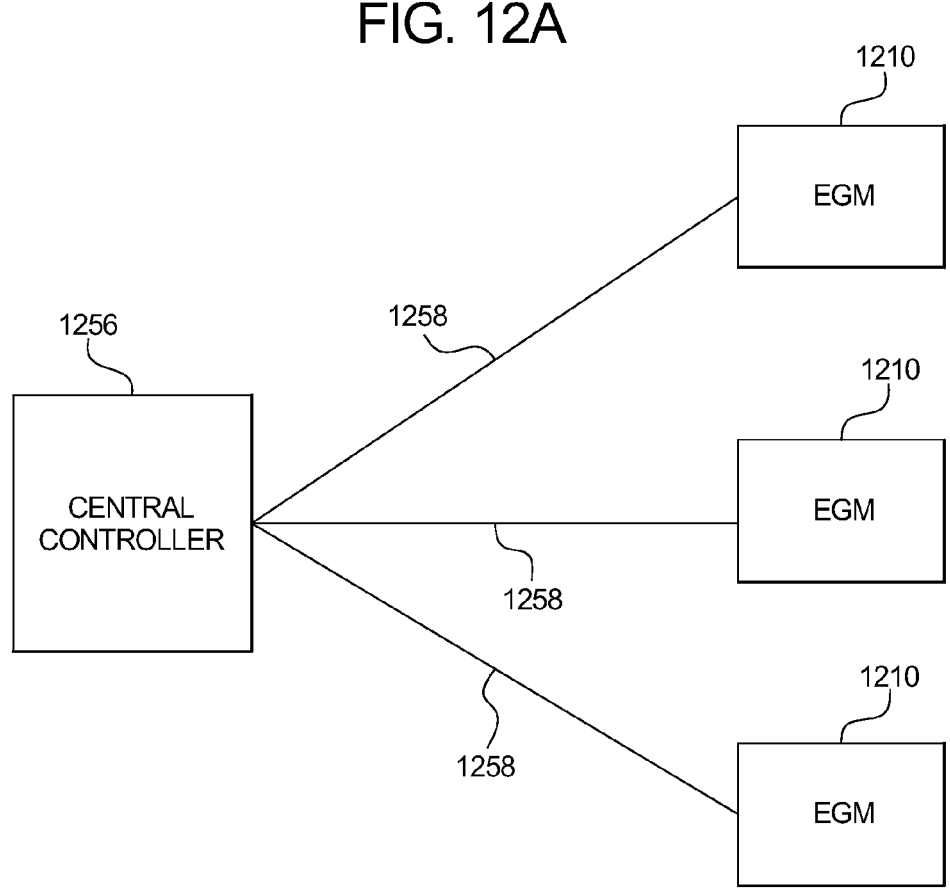

GAMING SYSTEMS AND METHOD PROVIDING GAME WITH MULTIDIRECTIONAL SPINNING SYMBOL DISPLAYS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are available. Gaming machines may generally require the player to place or make a wager to activate the primary or base game. In many of these gaming machines, the award may be based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which may provide secondary or bonus games are also available. The secondary or bonus games usually provide an additional award, such as a bonus award, to the player. Secondary or bonus games usually do not require an additional wager by the player to be activated. Instead, secondary or bonus games may generally be activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine may generally indicate this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

There is a continuing need to provide new primary games and new secondary games.

SUMMARY

Various embodiments of the present disclosure provide a gaming system and method which displays one or more symbol displays. Each symbol display has a plurality of symbol sets thereon. Each symbol set on each symbol display extends along a different circumferential path about that symbol display. The gaming system configures each symbol display to rotate or spin in each of a plurality of different directions or about a plurality of different axes of rotations. The plurality of different directions respectively correspond to the plurality of different circumferential paths.

In certain embodiments, one or more of the symbol displays are spherical. In other embodiments, one or more of the symbols displays are other suitable displayed three-dimensional objects or geometric shapes.

In certain embodiments, each of the plurality of symbol sets of each of the symbol displays are from the same group of symbols. For example, the gaming system selects all of the symbols in all of the symbol sets of all of the symbol displays from the group of symbols including the letters A to T.

In certain embodiments, two or more of the plurality of symbol sets of the symbol displays are from different groups of symbols. For example, the gaming system selects the symbols in two of the symbol sets of the symbol displays from two different groups of symbols such as a first symbol set including the letters A to T and a second symbol set including the numbers two to ten, and Jack, Queen, King, and Ace.

In certain embodiments, the gaming system enables the player to select the spin direction for one or more of the symbol displays. In certain embodiments, the gaming system enables the player to select one spin direction for each of the symbol displays. In other embodiments, the gaming system enables the player to separately select the direction of spin for each displayed symbol display. In certain embodiments, the gaming system enables the player to select the spin direction by touching and dragging the symbol display in the selected direction. In other embodiments, the gaming system displays direction indicators, such as arrows, associated with all or with each of the symbol displays.

In certain embodiments, for a play of a game, the gaming system enables the player to select one or more directions of spin or circumferential paths for the symbol displays, and then spins the symbol displays in the selected direction(s) or along the selected circumferential paths. After the gaming system stops the spinning symbol displays, each symbol display displays one randomly generated symbol. The displayed symbol is selected from the symbol set extending along the circumferential path of the symbol display which corresponds to the direction of spin of the symbol display. The gaming system evaluates the displayed symbols for any winning combinations. If the gaming system determines any winning combinations, the gaming system provides the player any awards associated with the displayed winning combinations.

Additional features and advantages are described herein, and will be apparent from the following Detailed Description and the Figures.

BRIEF DESCRIPTION OF THE FIGURES

FIG. 1 is a flowchart illustrating an example method of operating an embodiment of the gaming system of the present disclosure wherein the gaming system spins at least one displayed symbol display of a plurality of displayed symbols displays in a player-selected direction.

FIG. 2A illustrates a screen shot of an example of an embodiment of the gaming system of the present disclosure wherein the gaming system displays a plurality of symbol displays and enables a player to select directions of spin for the symbol displays.

FIG. 2B illustrates a screen shot of an example of the embodiment of FIG. 2A wherein the gaming system spins the symbol displays in the player-selected directions.

FIG. 2C illustrates a screen shot of an example of the embodiment of FIG. 2A wherein the gaming system stops each spinning symbol displays and displays a symbol thereon.

FIG. 3A illustrates a screen shot of an example of another embodiment of the gaming system of the present disclosure wherein the gaming system enables a player to choose a symbol set for a play of a game by selecting a direction of spin for the symbol displays.

FIG. 3B illustrates a screen shot of an example of the embodiment of FIG. 3A wherein the gaming system spins the symbol displays in the player-selected direction.

FIG. 4 illustrates a screen shot of an example of another embodiment of the gaming system of the present disclosure which includes a display device capable of enabling a player to touch and drag the symbol displays to view other sides of the symbol displays.

FIG. 5 illustrates a screen shot of an example of another embodiment of the gaming system of the present disclosure wherein the gaming system randomly determines a direction of spin for each displayed symbol displays.

FIG. 6 illustrates a screen shot of an example of another embodiment of the gaming system of the present disclosure wherein the gaming system displays the symbol displays bouncing, spinning and rolling about the display device.

FIG. 7 illustrates a screen shot of an example of another embodiment of the gaming system of the present disclosure wherein the gaming system displays the symbol displays bouncing, spinning and rolling about the display device such that the symbol displays ultimately change position and order relative to the other symbol displays.

FIG. 8A illustrates a screen shot of an example of another embodiment of the gaming system of the present disclosure wherein the gaming system displays a single symbol display with a selection window and enables a player to catch symbols in the selection window.

FIG. 8C illustrates a screen shot of an example of the embodiment of FIG. 8A wherein the gaming system receives a player input to catch a different symbol in the selection window.

FIG. 8D illustrates a screen shot of an example of the embodiment of FIG. 8A wherein the gaming system provides a player an award for catching symbols in the selection window.

FIG. 10 is a chart listing various examples of embodiments of shapes for symbol displays and/or distributions of symbol locations on the symbol displays.

FIG. 12A is a schematic block diagram of one embodiment of the gaming system disclosed herein including a central server, central controller, or remote host configured to communicate with a plurality of EGMs over a data network or remote communications link.

DETAILED DESCRIPTION

Spinning Symbol Displays

Figure 8B:
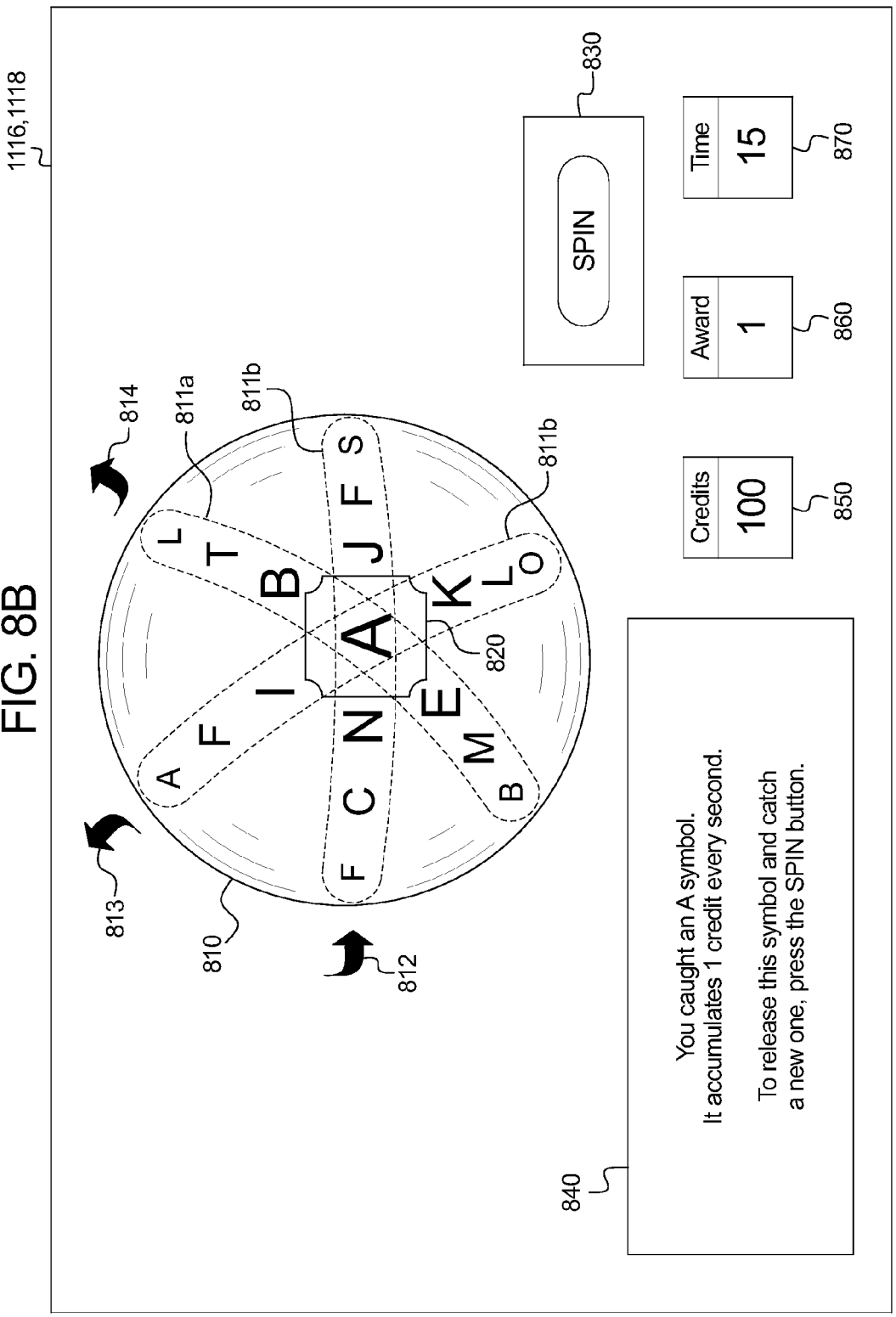
FIG. 8B illustrates a screen shot of an example of the embodiment of FIG. 8A wherein the gaming system receives a player input to catch a symbol in the selection window.

FIG. 1 illustrates a flowchart of an example process or method 100 for operating a gaming system of one example embodiment of the present disclosure. In various embodiments, one or more processors execute a set of instructions to implement the process 100. Although process 100 is described with reference to the flowchart shown in FIG. 1, the gaming system may employ many other processes of performing the acts associated with this illustrated process. For example, the gaming system may change the order of certain of the illustrated blocks and/or diamonds. The gaming system can also make certain of the illustrated blocks and/or diamonds optional, and/or the gaming system may not employ certain of the illustrated blocks and/or diamonds.

The gaming system displays a plurality of symbols displays as indicated by block 102. Each symbol display has a plurality of symbol sets thereon. Each symbol set on each symbol display extends along a different circumferential path about that symbol display. The gaming system configures each symbol display to rotate or spin in each of a plurality of different directions or about a plurality of different axes of rotations. The plurality of different directions respectively correspond to the plurality of different circumferential paths.

As indicated by block 104, the gaming system receives an input of a player-selected direction of spin for at least one of the symbol displays. It should be appreciated that the gaming system determines the direction of spin for any symbol displays for which the player did not select a direction of spin. The gaming system causes each of the symbol displays to spin in one of the different directions, at least one of which spins in the player-selected direction as indicated by block 106. The gaming system causes each of the symbol displays to stop spinning as indicated by block 108. The gaming system displays one symbol for each symbol display as indicated by block 110. The displayed symbol for each symbol display corresponds to the symbol set associated with the spun direction for that symbol display. The gaming system determines whether the symbol displays display any winning symbol combinations as indicated by diamond 112. If the gaming system determines that the symbol displays do not display any winning symbol combinations, the gaming system returns to block 102. If the gaming system determines that the symbol displays display winning symbol combinations, the gaming system provides any associated awards as indicated by block 114, and the gaming system returns to block 102.

Referring now to FIGS. 2A, 2B, and 2C, one example embodiment of the present disclosure is illustrated. The example gaming system of FIG. 2A displays three symbol displays 210, 220, and 230. In this example embodiment, each of the symbol displays is spherical and has a plurality of symbol sets thereon, wherein each symbol set extends along a different circumferential path about that symbol display.

More specifically:

(i) Symbol display 210 has a plurality of symbol sets 211a, 211b, and 211c which each include a plurality of symbols. The gaming system displays a portion of each of the symbol sets 211a, 211b, and 211c disposed about a different circumferential path of symbol display 210. The different circumferential paths of symbol display 210 correspond to different rotational axes. The symbol display 210 is configured to spin in different directions about the different rotational axes. In other words, each symbol set is on a different circumferential path which corresponds to a different direction of spin for the symbol display 210. The gaming system is configured to display any one of the symbols of the symbol sets at a symbol display position 212 associated with the symbol display 210;

(ii) Symbol display 220 has a plurality of symbol sets 221a, 221b, and 221c which each include a plurality of symbols. The gaming system displays a portion of each of the symbol sets 221a, 221b, and 221c disposed about a different circumferential path of symbol display 220. The different circumferential paths of symbol display 220 correspond to different rotational axes. The symbol display 220 is configured to spin in different directions about the different rotational axes. In other words, each symbol set is on a different circumferential path which corresponds to a different direction of spin for the symbol display 220. The gaming system is configured to display any one of the symbols of the symbol sets at a symbol display position 222 associated with the symbol display 220; and (iii) Symbol display 230 has a plurality of symbol sets 231a, 231b, and 231c which each include a plurality of symbols. The gaming system displays a portion of each of the symbol sets 231a, 231b, and 231c disposed about a different circumferential path of symbol display 230. The different circumferential paths of symbol display 230 correspond to different rotational axes. The symbol display 230 is configured to spin in different directions about the different rotational axes. In other words, each symbol set is on a different circumferential path which corresponds to a different direction of spin for the symbol display 230. The gaming system is configured to display any one of the symbols of the symbols sets at a symbol display position 232 associated with the symbol display 230.

In the example embodiment of FIGS. 2A, 2B, and 2C, each of the symbols in each of the symbol sets on each of the symbol displays are from the same group of symbols. In this example, each of the symbols are letters from a group of letters including letters A through T. Because each of the symbols of each of the symbol sets are from the same group of symbols, the gaming system configures each symbol display such that the symbol display may spin in any direction, independent from the direction of spin of the other symbol displays. This is because the gaming system can generate a winning symbol combination across the symbol display positions regardless of the individual direction of spin for each of the symbol displays. In an example wherein each of the symbol sets include symbols selected from the group of letters A to T, regardless of the direction of spin for each individual symbol display, each symbol displayed at the symbol display positions of the symbol displays will be from a symbol set including symbols from the group of letters A through T. Put differently, for this example, any symbol which the gaming system displays at the symbol display positions will be a letter, no matter the direction of spin.

In another embodiment, regardless of whether or not each of the symbols in each of the symbol sets on each of the symbol displays are from the same group of symbols, to reduce the quantity of individual paytables utilized in association with a play of the game, the gaming system requires that all symbol displays spin in the same direction.

The gaming system also displays selectable direction indicators for each symbol display, such as arrows 213, 214, and 215 associated with symbol display 210; arrows 223, 224, and 225 associated with symbol display 220; and arrows 233, 234, and 235 associated with symbol display 230. The arrows respectively correspond to the different directions of spin for each symbol display, which correspond to the circumferential paths, and the symbol sets on each of the symbol displays 210, 220, and 230.

In this illustrated example, the gaming system further displays a message box 240, a credit meter 250, a wager meter 260, and an award meter 270. The message box 240 contains any suitable message such as "Select a direction for each of the symbol displays to spin, then press the SPIN button." In this example, before any wager, the credit meter 250 initially displays one hundred credits, and the wager meter 260 and the award meter 270 do not initially display any credits.

For a play of a game, after the player makes a wager, the gaming system enables the player to select one of the arrows 213, 214, and 215, one of the arrows 223, 224, and 225, and one of the arrows 233, 234, and 235, to indicate the desired directions of spin for each of the symbol displays as shown in FIG. 2A. In the example shown in FIG. 2A, the player has selected arrow 215 for symbol display 210, arrow 225 for symbol display 220, and arrow 234 for symbol display 230. By selecting an arrow and thus selecting a direction of spin, the player has also selected the corresponding symbol set (along the circumferential path corresponding to the direction of spin) for each of the symbol displays 210, 220, and 230.

After receiving an indication that the player has selected the SPIN button 280, the gaming system displays the symbol displays spinning in the selected directions as generally shown by FIG. 2B. In this example, message box 240 displays any suitable message such as "The symbol displays are spinning . . . ." At this point in this example embodiment (after the gaming system has received from the player a wager of ten credits), the credit meter 250 displays ninety credits and the wager meter 260 displays ten credits. At this point, the award meter 270 does not display any credits.

FIG. 2C illustrates the symbols displays after the symbol displays have stopped spinning. In this example, each symbol display displays a B symbol at the respective associated symbol display positions 212, 222, and 232. The gaming system evaluates the displayed symbols (which extend across a single payline including symbol display positions 212, 222, and 232) for any winning symbol combinations. The gaming system provides the player any awards associated with the displayed winning symbol combinations according to a paytable. In this example, three B symbols are a winning symbol combination with an award of thirty credits. Message box 240 displays a suitable message such as "You won an award of 30 credits for three B's!" Award meter 270 displays an award of thirty credits. Credit meter 250 increases by the thirty credit award to display one hundred and twenty credits. At this point, the wager meter 260 does not display any credits. In this example, the gaming system generated three B symbols. In this example, a winning symbol combination was possible regardless of the selected directions of spin because, as discussed previously, each of the symbol sets include symbols from the same group.

Referring now to FIGS. 3A and 3B, another example embodiment of the present disclosure is illustrated. The gaming system of FIG. 3A displays three spherical symbol displays 310, 320, and 330. Symbol display 310 includes a plurality of symbol sets 311a, 311b, and 311c and is configured to display any single symbol from any of those sets at symbol display position 312. Symbol display 320 has a plurality of symbols sets 321a, 321b, and 321c and is configured to display any single symbol form any of those sets at a symbol display position 312. Symbol display 330 has a plurality of symbol sets 331a, 331b, and 331c and is configured to display any single symbol from any of those sets at symbol display position 332. Like the above example, each of the symbols sets 311a, 311b, 311c, 321a, 321b, 321c, 331a, 331b, and 331c respectively extend around a different circumferential path of each respective symbol display. The symbol sets 311a, 311b, 311c, 321a, 321b, 321c, 331a, 331b, and 331c each include a plurality of symbols. In this example, the three different symbol sets of each individual symbol display are from three different groups of symbols. More specifically, in this example, symbol sets 311a, 321a, and 331a are from the group of symbols including the letters A to T (which includes the illustrated symbols A to D); symbol sets 311b, 321b, and 331b are from the group of symbols including single bars, double bars, and triple bars, 7s, and wilds; and symbol sets 311c, 321c, and 331c are from the group of symbols including card symbols such as hearts, diamonds, spades, clubs, jacks, queens, kings, and aces (including the illustrated hearts, diamonds, spades, clubs).

In one embodiment, one or more of the symbol sets include one or more overlapping symbols. Overlapping symbols are symbols included in more than one symbol set. For example, the different symbol sets 311a, 311b, 311c, 321a, 321b, 321c, 331a, 331b, and 331c can include one or more overlapping symbols. Specifically, the overlapping symbols shown in FIG. 3A include the wild symbols displayed at symbol positions 322 and 332. The wild symbol at symbol position 322 is included in the symbol sets 321a, 321b, and 321c of symbol display 320. The wild symbol displayed at symbol position 332 is included in the symbol sets 331a, 331b, and 331c of symbol display 330. In this example, the gaming system does not display a symbol at symbol position 312 because the symbol sets do not have an overlapping symbol at that particular intersection of circumferential paths.

In this example, the gaming system displays arrows 313, 314, and 315, which are associated with symbol display 310. The gaming system also displays the SPIN button 280. In this example, the arrows correspond to directions of spin for each of the symbol displays. The directions of spin correspond to the circumferential paths of the symbol sets on the symbol displays. In this example, the gaming system displays one set of arrows because each of the symbol displays are configured to spin in the same direction. The symbol displays are configured to spin in the same direction because, as described above, the symbol sets of each individual symbol display include symbols selected from different groups of symbols. In this way, choosing a same direction of spin for each of the symbol displays chooses the symbol sets of each symbol display which include symbols from the same group of symbols. In other words, the symbol displays each spin in the same direction such that the symbols displayed when the symbol displays stop spinning are either from the same group of symbols, or are overlapping symbols which are included in more than one symbol set on the associated symbol display.

The gaming system displays message box 240, credit meter 250, wager meter 260 and award meter 270. Message box 240 contains a suitable message such as "Choose a group of symbols for this play of the game by choosing a direction of spin for the symbol displays, then press the SPIN button." In this example, credit meter 250 initially displays one hundred credits, wager meter 260 and award meter 270 initially display no credits.

For a play of the game of this example embodiment, the gaming system enables a player to place a wager and select one of the arrows 313, 314, and 315 to indicate one direction of spin or circumferential path for each of the symbol displays as shown in FIG. 3A. The gaming system may indicate the selection of the arrows in any suitable manner. In the example embodiment shown in FIG. 3B, the player has selected arrow 315 for the symbol displays 310, 320 and 330. As discussed above, by enabling the player to select an arrow to select a direction of spin, the gaming system has also enabled the player to select the corresponding symbol set for that circumferential path. In this example embodiment, the player-selected group of symbols is the card symbols, such as the illustrated hearts, diamonds, spades and clubs which are included in symbol sets 311a, 321a, and 331a.

After receiving an indication that the player has selected the SPIN button 280, the gaming system displays the symbol displays spinning in the selected direction as shown by FIG. 3B. At this point in the example, the gaming system has already received a wager from a player, and therefore the credit meter 250 displays ninety credits, wager meter 260 displays ten credits, and award meter 270 displays no credits. Message box 240 displays any suitable message such as "You selected spinning the first symbol display towards the upper right. All of the symbol displays are spinning to the upper right. You are using the card symbol group of symbols!"

Similar to the example embodiment of FIGS. 2A, 2B and 2C, the gaming system stops the spinning of the symbols displays. The symbol displays each display one of the symbols of the selected symbol set at the respective symbol display positions. The gaming system evaluates the displayed symbols for any winning symbol combinations including symbol display positions 312, 322, and 332. The gaming system provides the player any awards associated with the displayed winning symbol combinations according to a paytable. In one embodiment, the gaming system evaluates one symbol on each of the symbol displays. For example, the gaming system forms a single payline (and/or single way to win evaluation) utilizing one symbol from each symbol display. In another embodiment, the gaming system evaluates a plurality of symbols on one or more of the symbol displays. For example, the gaming system forms a plurality of paylines (and/or a plurality of way to win evaluations) utilizing a plurality of symbols from one or more of the symbol displays. In another embodiment, the gaming system evaluates each of the symbols on each of the symbol displays. For example, the gaming system forms a plurality of paylines (and/or a plurality of way to win evaluations) utilizing each of the symbols from each of the symbol displays.

Referring now to FIG. 4, in another example embodiment of the present disclosure, the gaming system enables the player to touch a touch screen input device on or around the location wherein the gaming system displays one of the symbol displays 410, 420 and 430. The gaming system enables the player to drag their finger in one of a plurality of directions radiating outwards from the location the player touched to rotate the symbol display in the direction that the player drags their finger. For example, the player touches the touch screen on or around symbol display 410. The player then drags their finger in one of the plurality of radiating directions. The dragging causes the touched symbol display 410 to rotate in the direction that the player dragged their finger. In this way, the player can examine the symbols on the sides and back of the symbol display which the gaming system otherwise does not initially display to the player. In certain embodiments, when the player releases their finger from touching and dragging, the symbol display snaps back, or returns, to its initial position.

Message box 240 of this example displays any suitable message, such as "Before choosing a direction of spin and hitting the SPIN button, touch and drag to see the other sides of the symbol displays."

Referring now to FIG. 5, in another example embodiment of the present disclosure, the gaming system does not enable a player to select the direction of spin for any of the displayed symbol displays. In this example, the gaming system selects a random direction of spin for each of the symbol displays 510, 520 and 530. Message box 240 displays any suitable message such as "Click the SPIN button to spin the symbol displays in random directions." It should be appreciated that in certain embodiments wherein the symbol sets contain symbols from different groups, the gaming system selects one direction of spin and spins each symbol display in the selected direction. It should further be appreciated that in the embodiments wherein the symbol sets contain symbols from the same group, the gaming system selects one or more different directions of spin.

Referring now to FIG. 6, in another example embodiment of the present disclosure, the gaming system illustrates the symbol displays moving in a plurality of different directions. In one such embodiment, the gaming system displays the symbol displays 610, 620 and 630 bouncing, spinning, and rolling. Message box 240 displays any suitable message such as "The symbol displays are bouncing, spinning, and rolling!"

In a further embodiment illustrated in FIG. 7, the symbols displays bounce, spin, and roll such that the symbol displays ultimately change positions or order relative to another of the symbol displays. For example, the gaming system causes symbol display 710 to bounce, spin, and roll such that when the symbol display stops spinning, the symbol display has moved from the leftmost position to the rightmost position. Symbol display 720 bounces, spins, and rolls such that when the symbol display stops spinning the symbol display has moved from the center position to the leftmost position. Symbol display 730 bounces, spins, and rolls such that when the symbol display stops spinning the symbol display has moved from the rightmost position to the leftmost position. Message box 240 displays any suitable message such as "The symbol displays are bouncing around and moving positions!" In one embodiment, the bouncing, spinning and rolling movements in the embodiments illustrated by FIGS. 6 and 7 do not affect the outcome of the symbol combinations displayed when the symbol displays stop spinning. In another embodiment, the bouncing, spinning, and rolling movements of FIGS. 6 and 7 affect the outcome of the symbol combinations displays when the symbol displays stop spinning. In another embodiment, at least two of the bouncing symbol displays collide with each other to convey a spin direction from one symbol display to another symbol display. It should be appreciated that the example embodiments of FIGS. 6 and 7 provide an exciting and interesting visual appearance to a player.

Catching Symbols

Referring now to FIGS. 8A, 8B, 8C, and 8D another example embodiment of the present disclosure is illustrated. The gaming system displays a single large symbol display 810. Symbol display 810 includes a plurality of symbol sets 811a, 811b, and 811c and is configured to display any symbol from the symbol sets in the symbol selection window 820. Like the above examples, each of the symbols sets 811a, 811b, and 811c of the symbol display 810 extend around a different circumferential path of symbol display 810, which corresponds to a different direction of spin for symbol display 810. In the example embodiment of FIGS. 8A to 8D, the plurality of symbols are from the same group of symbols, i.e. the letters A to T.

The gaming system displays selectable direction indicators for symbol display 810, such as arrows 812, 813, and 814, which correspond to directions of spin for symbol display 810. The directions of spin correspond to the circumferential paths of the symbol sets on symbol display 810. The gaming system displays a spin activator such as the SPIN button 830.

The gaming system further displays a message box 840, a credit meter 850, an award meter 860 and a time meter 870. The message box 840 contains any suitable message such as "You've won a free play of a bonus game! Press the SPIN button to spin the symbol display, then use the arrows or touch and drag to change the spin direction to catch symbols in the selection window and accumulate prizes! You only have 20 seconds, so it's best to catch a high paying symbol!" The credit meter 850 initially displays one hundred credits. The time meter 870 initially displays twenty seconds.

For a play of the game, after receiving an indication that the player selected the SPIN button 830, the gaming system displays the symbol display spinning in a selected direction. The symbol display spins slowly enough that the player can see upcoming symbols before the upcoming symbols pass through the selection window. The gaming system enables the player to adjust the direction of spin by touching and dragging on the touch screen display device, or by selecting the arrows 812, 813, and 814. When the player touches and drags or selects an arrow, the gaming system displays the symbol display changing its direction of spin to match the player-selected direction. In this way the gaming system does not limit the player to the predefined symbol sets (such as the symbol sets 811a, 811b and 811c of FIG. 8A). In one alternative embodiment, the symbol displays are associated with a certain amount of momentum, such that the player's interaction to change the direction of a spin, or to stop a spin does not take place immediately, but rather takes player over a designated period of time. In these embodiments, by changing the direction of spin during the game the player in essence creates their own symbol set for that play of the game which includes portions of the predefined symbol sets. In this example, the gaming system enables the player to catch a symbol by touching and holding on the touch screen display device. When the player touches and holds on the touch screen display device, the gaming system stops the spin of the symbol display and displays a symbol in the selection window 820.

FIG. 8B illustrates a screen shot of the play of the game when five seconds have elapsed. The time meter 870 shows that fifteen seconds remain in the bonus game. The gaming system enabled the player to catch an A symbol in the selection window 820 by touching and holding on the touch screen display device. In this embodiment, the A symbol accumulates credits at a rate of one credit per second. The player has held the A symbol for one second already, as evidenced by the award meter 860 which displays an award of one credit. Message box 840 displays any suitable message such as "You caught an A symbol. It accumulates 1 credit every second. To release this symbol and catch a new one press the SPIN button." It should be appreciated that the player chooses between taking the rate of credit accumulation provided by the A symbol or releasing the A symbol in hopes of catching a symbol that accumulates credits more quickly.

FIG. 8C illustrates a screen shot of the play of the game when twelve seconds have elapsed. The time meter 870 shows that eight seconds remain in the bonus game. The gaming system enabled the player to release the A symbol previously caught in FIG. 8B, and has now enabled the player to catch a D symbol. In this embodiment, the D symbol accumulates credits at a rate of five credits per second. The player has just caught the D symbol as evidenced by the award meter 860 which still displays one credit. Message box 840 displays any suitable message such as "You caught a D symbol. It accumulates 5 credits every second. To release this symbol and catch a new one press the SPIN button."

FIG. 8D illustrates a screen shot of the play of the game when all twenty seconds have elapsed. The time meter 870 shows that zero seconds remain in the bonus game. The gaming system enabled the player to keep the D symbol from FIG. 8C for the remaining eight seconds of the bonus game. Message box 840 displays any suitable message such as "Congratulations! You won an award of 41 credits for catching symbols in this bonus game!" The bonus game provided the player an award of forty one credits, one credit of which was from holding the A symbol for one second, and forty credits of which were from holding the D symbol for eight seconds. The gaming system increases credit meter 850 by forty one credits.

In certain embodiments the gaming system enables the player to catch a symbol in the selection window by selecting the spin button 830. In certain other embodiments, the gaming system enables the player to release the symbol from the selection window by releasing their touch and hold on the symbol. In certain other embodiments the gaming system automatically freezes the caught symbol in the selection window and does not require the player to hold the touch to keep the symbol. In certain other embodiments, each symbol has an associated total accumulated credits value which is the maximum number of credits that may be accumulated by that symbol in a play of the game. In certain such embodiments, the gaming system causes the symbol to automatically release from the selection window if award meter reaches a total accumulated credits value for that symbol. In a further embodiment, if there is time remaining on the time meter 870, the gaming system enables the player to catch a new symbol. In certain other embodiments, when the award meter reaches the total accumulated credits value for a symbol the gaming system causes the game to end regardless of the amount of time remaining on the time meter 870. In certain embodiments the gaming system does not enable the player to catch the symbol by pressing the SPIN button or touching and holding on the touch screen. In these example embodiments, the gaming system enables the player to tap or touch the touch screen to slow the spin speed of the symbol display until the symbol display eventually comes to a stop. In these embodiments, the symbol that the gaming system displays in the selection window when the symbol display stops spinning is the caught symbol. In another embodiment, the gaming system removes any caught symbols from the symbol display leaving a blank symbol position. In another embodiment, the gaming system removes any caught symbols from the symbol display and replaces the removed symbol with another symbol, such as a predetermined symbol or a randomly determined symbol.

Counting Symbols

Figure 9:
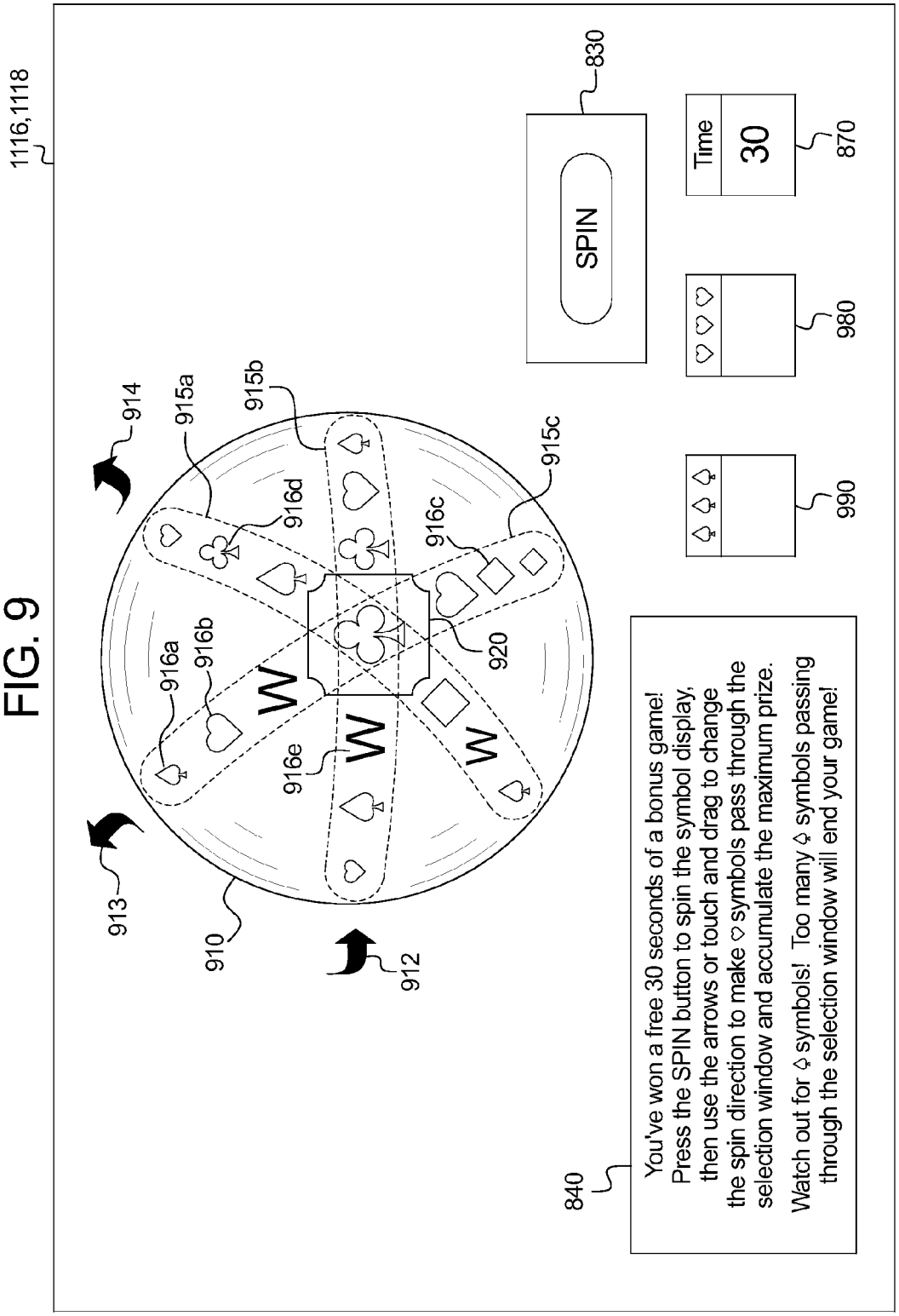
FIG. 9 illustrates a screen shot of an example of another embodiment of the gaming system of the present disclosure wherein the gaming system displays a single symbol display with a selection window and enables a player to change the direction of spin of the symbol display to influence which symbols pass through the selection window.

Referring now to FIG. 9, another example embodiment of the present disclosure is illustrated. The gaming system of FIG. 9 displays a single large symbol display 810 which is similar to the symbol display of FIG. 8A.

In the example embodiment of FIG. 9, the plurality of symbols 916*a* to 916*e* of the symbol sets 915*a*, 915*b*, and 915*c* are from the same group of symbols (e.g., hearts, spades, diamonds, clubs and wilds). In this example embodiment, heart symbols 916*b* are accumulating symbols which accumulate in a counter when the accumulating symbols pass through the selection window 920. In this example embodiment, spade symbols 916*a* are terminating symbols illustrated as whammy symbols which increase a counter towards a designated number when the whammy symbols pass through the selection window 920. In this example embodiment, a plurality of other symbols, including 916*c* to 916*e*, are not accumulating symbols or whammy symbols (i.e., normal symbols). Normal symbols have no positive or negative effects when passing through the selection window.

The gaming system further displays a message box 840, an accumulating symbol meter 980, a whammy symbol meter 990 and a time meter 870. The message box 840 contains any suitable message such as "You've won a free 30 seconds of a bonus game! Press the SPIN button to spin the symbol display, then use the arrows or touch and drag to change the spin direction to make ♥ symbols pass through the selection window and accumulate the maximum prize! Watch out for ♠ symbols! Too many ♠ symbols passing through the selection window will end your game!" The time meter 870 initially displays thirty seconds. The accumulating symbol meter 980 and the whammy symbol meter 990 do not display any counted symbols. The accumulating symbol meter 980 counts the number of accumulating symbols that pass through selection window 920. The whammy symbol meter 990 counts the number of whammy symbols that pass through selection window 920.

For a play of the game, after receiving an indication that the player selected the SPIN button 830, the gaming system displays the symbol display spinning in a selected direction. The gaming system spins the symbol display slowly enough that the player can see upcoming symbols before the upcoming symbols pass through the selection window. The gaming system enables the player to adjust the direction of spin by touching and dragging on the touch screen display device, or by selecting the arrows 912, 913, and 914. When the player touches and drags or selects an arrow, the gaming system displays the symbol display changing its direction of spin to match the player-selected direction. It should be appreciated that a skillful player will change the direction of spin to avoid whammy symbols passing through the selection window 920 or in order to allow accumulating symbols to pass through the selection window 920.

In this illustrated embodiment, play of the game continues until no time remains on the time meter 870, or until the whammy meter 990 counts a designated number of whammy symbols. At the end of the play of the game, the gaming system provides the player an award based at least in part on the quantity of accumulating symbols which passed through the selection window, counted by the accumulating symbol meter 980.

In certain embodiments, the gaming system enables the player to touch the touch screen or tap the touch screen to slow the spin speed of the symbol display. It should be appreciated that the slower spin speed means that fewer symbols will pass through the selection window. In certain of these embodiments, the gaming system enables the player to touch or tap the touch screen to stop the spin completely. The gaming system enables the player to restart the spin by touching and dragging, pressing the SPIN button or selecting a direction indicator.

In certain other embodiments the gaming system does not respond immediately to a selection of a new direction of spin. In further certain embodiments, the gaming system uses a determined response time to change the direction of spin after the player's selection of a new direction. In this way the gaming system can prevent the player from hitting every accumulating symbol that the player tries to direct through the selection window by changing the direction of spin. This also provides player excitement and interest by providing near-misses and close-calls. In some instances, the gaming system will adjust the direction of spin in time to hit the player's desired symbol. In other instances, the gaming system will not adjust the direction of spin in time to hit the player's desired symbol. In other instances, even when a player is trying not to hit a specific symbol, the gaming system can employ the random response time to still hit the undesired symbol. In this way, the gaming system can control a minimum and maximum payback when the player is interacting with the game. The gaming system may also use the response time to create the same distribution of outcomes no matter the changes to the spin direction.

Symbol Displays

As shown in the example embodiments of FIGS. 2A, 2B, 2C, 3A, 3B, 4, 5, 6, 7, 8A, 8B, 8C, 8D, and 9 the symbol displays are spherical. It should be appreciated that in other embodiments, one or more of the symbols displays are other suitable displayed three-dimensional objects or geometric shapes. FIG. 10 illustrates some non-limiting examples of three-dimensional objects or geometric shapes. These example shapes include a cube 1001a, an octahedron 1001b, a dodecahedron 1001c, an icosahedron 1001d, and a truncated octahedron 1001e. The gaming system may use a variety of the shapes in a single play of the game to make the game more interesting and exciting. It should be appreciated that if the shapes of the symbol displays are not symmetrical from the viewpoint of every symbol contained on the shape, then the shape may offer different directions of spin based on the symbol currently showing.

FIG. 10 also illustrates different geometric distributions of the symbols and symbol sets on the symbol displays. FIG. 10 illustrates that the greater the number of symbols on the symbol displays, the smaller each symbol position becomes. Shapes 1001a, 1001b, 1001c, 1001d, and 1001e represent different possible distributions of symbols on the surface of the spherical symbol display.

For example, if the gaming system uses the cubic distribution 1001a, each symbol display has six total symbols 1002a. The gaming system displays the symbols at locations corresponding to faces of the cube. The gaming system enables the player to select between two possible directions of spin 1003a (such as horizontal or vertical) from any given symbol location. The cubic distribution of symbols includes three symbol sets 1004a. Each symbol set includes four symbols 1005a.

In another example wherein the gaming system uses the octahedral distribution 1001b, each symbol display has eight total symbols 1002b. The gaming system displays the symbols at locations corresponding to faces of the octahedron. The gaming system enables the player to select between three possible directions of spin 1003b from any given symbol location. The octahedral distribution of symbols includes four symbol sets 1004b. Each symbol set includes six symbols 1005b.

In another example wherein the gaming system uses the dodecahedral distribution 1001c, each symbol display has twelve total symbols 1002c. The gaming system displays the symbols at locations corresponding to faces of the dodecahedron. The gaming system enables a player to select between five possible directions of spin 1003c from any given symbol location. The dodecahedral distribution of symbols includes ten symbol sets 1004c. Each symbol set includes six symbols 1005c.

In another example wherein the gaming system uses the icosahedral distribution 1001d, each symbol display has twenty total symbols 1002d. The gaming system displays the symbols at locations corresponding to faces of the icosahedron. The gaming system enables a player to select between three possible directions of spin 1003d from any given symbol location. The icosahedral distribution of symbols includes six symbol sets 1004d. Each symbol set includes ten symbols 1005d.

In another example wherein the gaming system uses the truncated octahedral distribution, 1001e each symbol display has fourteen total symbols 1002e. The gaming system displays the symbols at locations corresponding to faces of the truncated octahedron. The gaming system enables the player to select between three possible directions of spin 1003e from any given symbol location which corresponds to a hexagonal face of the truncated octahedron. The gaming system enables the player to select between two possible directions of spin 1003e from any given symbol location which corresponds to a square face of the truncated octahedron. The truncated octahedral distribution of symbols includes six symbol sets 1004e. Each symbol set includes six symbols 1005e.

It should be appreciated that though three arrows are illustrated in the figures, there are six directions of spin for each of those illustrated symbol displays. There are twice as many directions of spin because each circumferential path extends about the symbol display in opposite directions from any given position on the path. Thus, in certain embodiments, each of the arrows (such as those illustrated in FIG. 2A) has a corresponding arrow directly across from said arrow displayed on the other side of the symbol display. In an example, arrow 213 which points horizontally to the right has a corresponding arrow which points horizontally to the left. It should be appreciated that these arrows may point in at each other or out and away from each other across the symbol display. It should further be appreciated that these corresponding arrows use the same symbol set extending along the same circumferential path of the symbol display and associated with the same rotational axis. In a 2-D example, this is akin to spinning clockwise or counter-clockwise.

In alternative embodiments, the gaming system includes more or fewer than three symbol displays. The gaming system displays these symbol displays in any suitable array or configuration. In further of these embodiments, the gaming system enables a player to play more than one payline in more than one configuration across the displayed symbol displays. The gaming system displays more symbol displays or more paylines in order to make the game more interesting and exciting.

In certain embodiments, the gaming system displays the symbol displays as a primary or base game. In further embodiments, the base game is operable on a wager, as in FIG. 2A. In certain other embodiments, the gaming system displays the symbol displays as a bonus or secondary game, as in FIG. 9A. In further embodiments, the bonus or secondary game is operable upon any suitable triggering event.

Figure 11:
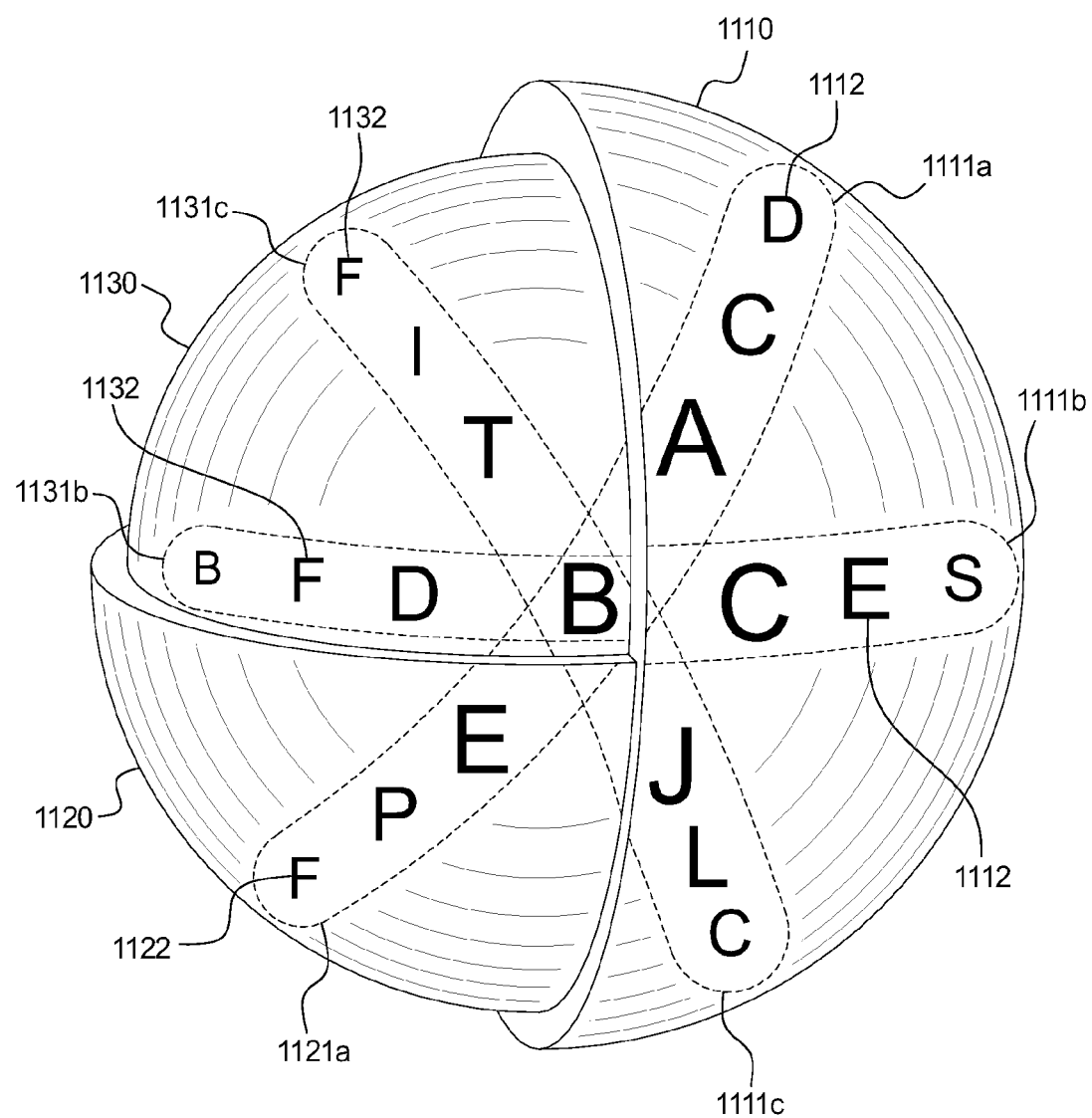
FIG. 11 illustrates an example concentric symbol displays of one or more embodiments of the gaming system disclosed herein.

In another embodiment, one or more of the symbol displays are concentric symbol displays. In this embodiment, each concentric symbol display includes a first or outer symbol display and one or more nested or inner symbol displays. In this embodiment, as described above, each symbol display of the concentric symbol display is spherical and has a plurality of symbol sets thereon, wherein each symbol set extends along a different circumferential path about that symbol display. For example, as seen in FIG. 11, a concentric symbol display includes a first symbol display 1110 including a plurality of symbol sets 1111a, 1111b and 1111c having a plurality of symbols 1112. The concentric symbol display of this example includes a second symbol display 1120 including a plurality of symbol sets (only symbol set 1121a shown in FIG. 11) having a plurality of symbols 1122 nested inside the first symbol display 1110. The concentric symbol display of this example further includes a third symbol display 1130 including a plurality of symbol sets (only symbol sets 1131b and 1131c shown in FIG. 11) having a plurality of symbols 1132 nested inside the second symbol display 1120. It should be appreciated that while FIG. 11 shows one concentric symbol display, the gaming system display and utilizes a plurality of concentric symbol displays in association with one or more plays of the games disclosed herein.

In operation of one such embodiment, a plurality of the symbol displays of a concentric symbol display spin to each generate a symbol wherein if a plurality of symbols of a plurality of the symbol displays align in a designated symbol position, the gaming system provides an award to a player. In this embodiment, the gaming system utilizes one or more symbols from each of a plurality of nested symbol displays to determine any award for the player. In operation of another such embodiment, a plurality of the symbol displays of a concentric symbol display spin to each generate a symbol wherein if a winning combination of symbols of the outer symbol display is formed, the gaming system removes the symbols of the winning combination of symbols to reveal the generated symbols of the second or middle symbol display. These revealed symbols are then evaluated (possibly in combination with the remaining symbols of the outer symbol display) to determine if any additional winning combination of symbols are formed. Such cascading symbols continues until no winning symbol combinations are formed.

Symbol Sets

In certain embodiments, each of the plurality of symbol sets of each of the symbol displays are from the same group of symbols, as shown in FIG. 2A. In one example, the gaming system selects each of the symbols in each of the symbol sets of each of the symbol displays from the group of symbols including the letters A to T. In certain such embodiments, the gaming system has the same probability of randomly selecting each of the same symbols. For example, the gaming system has a 10% chance of randomly selecting each B symbol in each symbol set. In certain other such embodiments, the gaming system has the same probability of randomly selecting two or more of the same symbol. For example, if there is one B symbol in each symbol set of one symbol display, the chance of selecting the B symbol in two symbol sets is 10% and the chance of selecting the B symbol in a third symbol set is 12%. In certain other embodiments, the gaming system has a different probability of randomly selecting each of the same symbols.

In other embodiments, the gaming system selects two or more of the plurality of symbol sets of the symbol displays from different groups of symbols as shown in FIG. 3A. In an example, the gaming device selects the symbols in two of the symbol sets of the symbol displays from two different groups of symbols, such that a first symbol set includes the letters A to T and a second symbol set includes the numbers two to ten, and Jack, Queen, King, and Ace. In these embodiments, the symbol sets may have zero, one or more overlapping symbols as described above.

In certain embodiments with overlapping symbols, the overlapping symbols are wild symbols. In other embodiments, the overlapping symbols are not wild symbols. In certain embodiments, the overlapping symbols are each the same symbol, such as a wild symbol. In other embodiments, the overlapping symbols are each different symbols. In other embodiments, the overlapping symbols include at least one different symbol and at least two same symbols.

In certain embodiments, the symbol sets include normal symbols and accumulating symbols. In other words, the symbol sets would not include any whammy symbols. In certain of these embodiments, the accumulating symbols are small wins which each provide a small award. In these embodiments, the play of the game would continue until the time meter displayed zero seconds remaining.

In certain embodiments, the paytables determined based on the symbol sets each have a same average expected payback percentage. It should be appreciated that the selected directions of spin (and associated symbol sets) in these embodiments does not affect the award outcome based on the displayed symbol combination, caught symbols, or counted symbols because each spin direction has the same likelihood of providing any given award outcome. In one embodiment, the average expected payback percentage of two or more symbols sets is the same because the gaming system makes each symbol available in each such symbol set and the gaming system weights the symbols so as to produce the same distribution of award outcomes. It should be appreciated that in a non-wagering embodiment, the paytables utilized for the plays of the games disclosed herein include an average expected payout (as opposed to an average expected payback percentage).

In another embodiment, the gaming system splices symbols into different symbol sets (as is common in video slot gaming systems) to give every spin direction the same distribution of award outcomes. For example, the gaming system may replace certain symbols in a symbol set with other symbols in order to adjust the distribution of award outcomes to the desired distribution. Thus, the gaming system can control the maximum number of accumulating symbols that the player sees and that the player can direct through the selection window.

In certain embodiments wherein the gaming system selects each of the symbols in the symbol sets from the same group of symbols (such as in FIG. 2A), the gaming system has one paytable. In other embodiments wherein the gaming system selects the symbols in the different symbol sets from different groups of symbols (such as in FIG. 3A), the gaming system has multiple paytables. Each of the multiple paytables in this embodiment still have the same average expected payback percentage. Even though the different symbol sets from different groups each have the same distribution of award outcomes, a player may prefer the aesthetics of one group above the others, or may believe that a certain group is luckier than the others.

In certain other embodiments, at least one symbol set on one or more symbol displays has a different distribution of award outcomes. In these embodiments, the gaming system enables the player to increase their average expected payback percentage by skillfully selecting the direction or directions of spin for the symbol displays which correspond to the symbol set or symbol sets with the better distributions of award outcomes. In these embodiments, the gaming system has multiple paytables. It should be appreciated that which paytable the gaming system ultimately uses depends on the selected directions of spin. For example, a gaming system displays three symbol displays, each of which includes three different directions of spin. If each direction of spin for each symbol display has a different distribution of award outcomes to produce a different average expected payback percentage, then the number of paytables is three (directions for first symbol display) times three (directions for second symbol display) times three (directions for third symbol display) which equals twenty seven different paytables.

In certain embodiments, the gaming system enables a player to touch-and-drag (described above with reference to FIG. 4). In this way the gaming system enables the player to review the un-displayed symbols on the other sides of the symbol displays prior to choosing a direction of spin. In further of these embodiments, the player may have a limited amount of time to review the symbol displays. In embodiments wherein at least one symbol set has a different distribution of award outcomes, the review may assist the skillful player to recognize the symbol sets with better distributions so the player may select the best spin directions to achieve the highest average expected payback percentage. In embodiments wherein each of the symbol displays has the same distribution of award outcomes, the player may believe that the distributions are different and may therefore want to review the un-displayed symbols to assist them in choosing a desired direction of spin.

In certain embodiments, the gaming system displays the symbol displays partially sunken into the screen of the display device, as shown in FIG. 2A. The gaming system displays a portion of the symbol display to the player, similar to the manner in which slot machine gaming systems typically display a portion of an entire reel drum to a player. In certain further embodiments, the gaming system enables the player to change the view of the symbol display to zoom in or zoom out and display larger or smaller portions of the symbol display. It should be appreciated that changing the view may also assist the player in their review of the symbol display.

Spinning the Symbol Displays

In certain embodiments, the gaming system enables the player to separately select the direction of spin for each displayed symbol display, as in FIG. 2A. In certain embodiments, the gaming system enables the player to select one direction of spin for the displayed symbol displays, as in FIG. 3A. In other embodiments, the gaming system enables the player select the spin direction for one or more of the symbol displays.

In certain embodiments, the input device includes a touch screen capable of recognizing at least one player touch at any given time. In certain other embodiments, the touch screen is capable of recognizing more than one touch from a player at any given time. In these embodiments, the gaming system enables the player to make multiple inputs at the same time using the touch screen (i.e., the gaming system enables the player to control the movement of more than one symbol display at a time).

In certain embodiments, the gaming system enables the player to select the spin direction by touching and dragging the symbol display in the selected direction. In certain of these embodiments, when the symbol displays have a limited number of possible spin directions, such as 3, the gaming system will spin the symbol display in the direction which most closely matches the player's input. In other embodiments, the gaming system displays direction indicators (such as the arrows 212, 213, 214 of FIG. 2A) associated with each of the symbol displays. In a further embodiment, fewer than each of the symbol displays include associated direction indicators as in FIG. 3A.

In a further embodiment, when the gaming system receives the player's selection of the direction indicator, the gaming system immediately spins the symbol display in the selected direction. The selection of the direction indicator may be indicated in any suitable manner, such as by highlighting the selected direction indicator. In another embodiment, when the gaming system receives the player's selection of the direction indicator, the gaming system does not spin the symbol display in the selected direction until the gaming system receives a non-directional input (such as the 'SPIN' button 280 of FIG. 2A). In an alternative embodiment, a plurality of symbol displays have separate associated non-directional input (i.e. a SPIN button associated with one or more symbol displays).

In certain embodiments, the gaming system separately determines the direction of spin for each individual symbol display as in FIG. 5. The gaming system then provides the player with an award within a determined distribution. In other embodiments, the gaming system determines a direction of spin and spins at least two displayed symbol displays in the determined direction. In a further embodiment, the gaming system determines one direction of spin and spins any displayed symbols displays in the determined direction. In certain embodiments, the gaming system determines the direction of spin for a symbol display when the player has not made an input to select a direction of spin for that symbol display.

In another embodiment, the gaming system enables one or more of the symbol displays to simultaneously or substantially simultaneously rotate or spin about a plurality of different axes of rotation.

Alternative Embodiments

It should be appreciated that in different embodiments, one or more of:
(i) a quantity of displayed symbol displays;
(ii) a quantity of directions of spin;
(iii) a quantity of symbols sets which include symbols selected from a same group relative to another symbol set;
(iv) a quantity of symbols sets which include symbols selected from a different group relative to another symbol set;
(v) the symbols included in one or more symbol sets;
(vi) a quantity of overlapping symbols included in more than one symbol set;
(vii) a quantity of paylines;
(viii) which of any paytables are utilized to determine any awards;
(ix) which awards are associated with which winning symbol combinations;
(x) which of any symbol sets are associated with a paytable having a same average expected payback percentage relative to another symbol set;
(xi) which of any symbol sets are associated with a paytable having a different average expected payback percentage relative to another symbol set;
(xii) whether a play of a game is a bonus game or a primary game;

(xiii) which of any directions of spin the gaming system selects to spin any symbol display;
(xiv) a displayed size of any symbol display;
(xv) a rate or speed at which any symbol display is displayed to spin;
(xvi) a total accumulated credit value associated with any symbol;
(xvii) a quantity of accumulating symbols included in the symbol sets;
(xviii) a quantity of whammy symbols included in the symbol sets;
(xix) a response time associated with a player selection of a direction of spin;
(xx) which rate of credit accumulation is associated with any symbol;
(xxi) which axis of rotation the symbol display spins about;
(xxii) any determination disclosed herein;
is/are predetermined, randomly determined, randomly determined based on one or more weighted percentages, determined based on a generated symbol or symbol combination, determined based on a random determination by the central controller, determined based on a random determination at the gaming system, determined based on at least one play of at least one game, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines (EGMs); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to below as an "EGM." Additionally, for brevity and clarity, unless specifically stated otherwise, "EGM" as used below represents one EGM or a plurality of EGMs, and "central server, central controller, or remote host" as used below represents one central server, central controller, or remote host or a plurality of central servers, central controllers, or remote hosts.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 12A includes a plurality of EGMs 1210 that are each configured to communicate with a central server, central controller, or remote host 1256 through a data network 1258.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 12B:
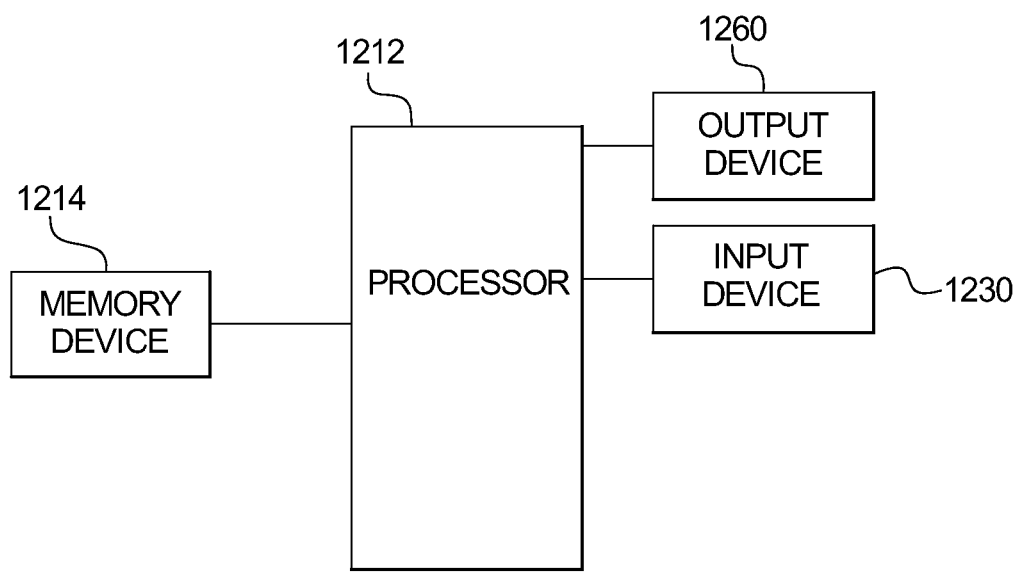
FIG. 12B is a schematic block diagram of an example electronic configuration of an EGM of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 12B illustrates an example EGM including a processor 1212.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 12B includes a memory device 1214. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 13A:
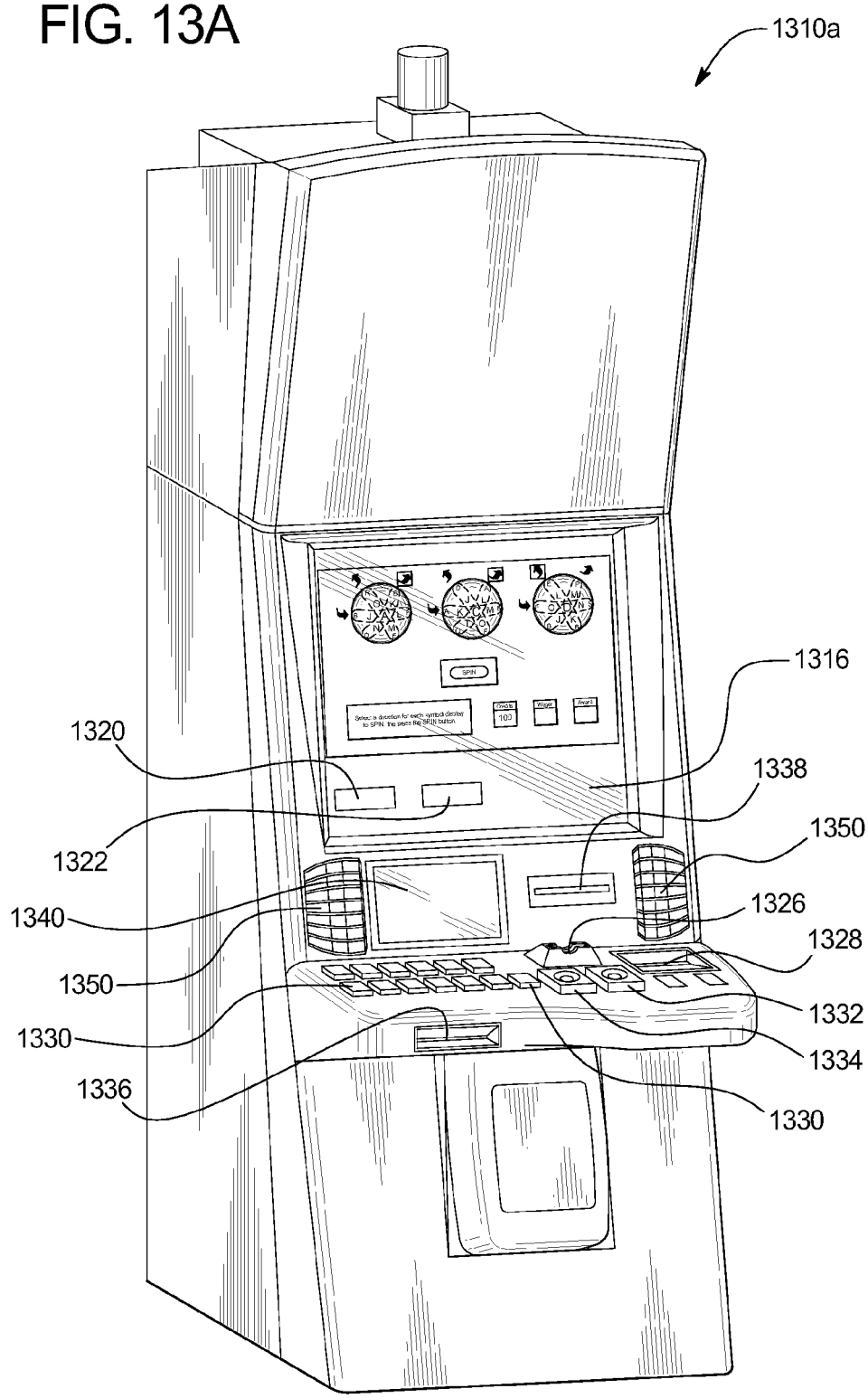
FIGS. 13A and 13B are perspective views of example alternative embodiments of EGMs of the present disclosure.
Figure 13B:
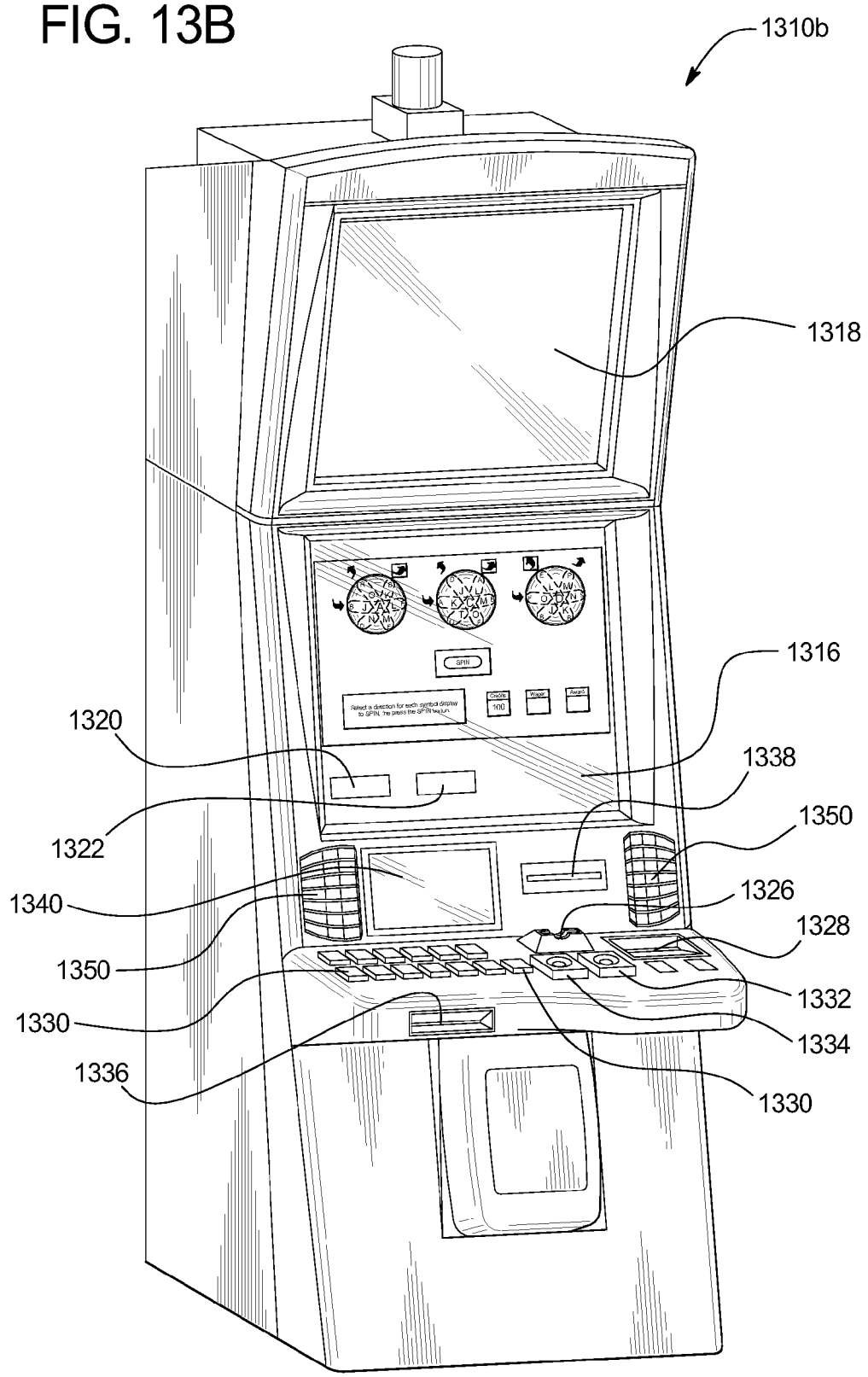

In various embodiments, the EGM includes one or more input devices. The input devices may include any suitable device that enables an input signal to be produced and received by the at least one processor of the EGM. The example EGM illustrated in FIG. 12B includes at least one input device 1230. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 13A and 13B illustrate example EGMs that each include the following payment devices: (a) a combined bill and ticket acceptor 1328, and (b) a coin slot 1326.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 13A and 13B each include a game play activation device in the form of a game play initiation button 1332. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 13A and 13B each include a cash out device in the form of a cash out button 1334.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 13A and 13B each include a card reader 1338. The card reader is configured to read a player identification card inserted into the card reader.

In various embodiments, the EGM includes one or more output devices. The example EGM illustrated in FIG. 12B includes at least one output device 1260. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 13A includes a central display device 1316, a player tracking display 1340, a credit display 1320, and a bet display 1322. The example EGM illustrated in FIG. 13B includes a central display device 1316, an upper display device 1318, a player tracking display 1340, a player tracking display 1340, a credit display 1320, and a bet display 1322.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 13A and 13B each include ticket generator 1336. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 13A and 13B each include a plurality of speakers 1350. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 13A and 13B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 13A and 13B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
 a housing;
 a plurality of input devices supported by the housing, said plurality of input devices including:
  (i) an acceptor, and
  (ii) a cashout device;
 at least one processor;
 at least one display device supported by the housing; and
 at least one memory device storing a plurality of instructions which when executed by the at least one processor, cause the at least one processor to operate with the at least one display device and the plurality of input devices to:
  (a) if a physical item is received via the acceptor, establish a credit balance based, at least in part, on a monetary value associated with the received physical item;
  (b) after establishing the credit balance based, at least in part, on the monetary value associated with the received physical item, for a play of a game:
   (i) display a plurality of symbol displays, each symbol display having a plurality of different symbol sets, each different symbol set including a different plurality of symbols and extending along a different circumferential path of the symbol display, and each symbol display configured to spin in a plurality of different directions, each different direction corresponding to a different one of the circumferential paths;
(ii) for one of the plurality of symbol displays, receive an input of a selected one of the plurality of different directions corresponding to the circumferential paths;
(iii) cause each of the symbol displays to spin in the selected direction;
(iv) cause each of the symbol displays to stop spinning;
(v) for each symbol display, display at least one of the symbols of the symbol set extending along the circumferential path of said symbol display which corresponds to the spun direction of said symbol display;
(vi) evaluate, via the at least one processor, the displayed symbols for any winning symbol combinations; and
(vii) if any winning symbol combinations are displayed by the symbol displays, provide any awards associated with said displayed winning symbol combinations, wherein the credit balance is increaseable based on any provided awards associated with said displayed winning symbol combinations; and
(c) if a cashout input is received via the cashout device, cause an initiation of any payout associated with the credit balance.

2. The gaming system of claim 1, wherein each symbol set of each symbol display includes a different distribution of symbols selected from a same group of symbols.

3. The gaming system of claim 2, wherein when executed by the at least one processor, the plurality of instructions cause the at least one processor to receive an individual selection of one of the plurality of different directions for each symbol display.

4. The gaming system of claim 1, wherein at least one symbol set includes symbols selected from one of a plurality of different groups of symbols.

5. The gaming system of claim 4, wherein at least one symbol display includes symbol sets having at least one overlapping symbol, wherein the at least one overlapping symbol is included in a plurality of said symbol sets.

6. The gaming system of claim 5 wherein the at least one overlapping symbol is a wild symbol.

7. The gaming system of claim 1, wherein at least one of the symbol displays includes an electro-mechanical symbol display coupled to the housing.

8. A method of operating a gaming system, the method comprising:
(a) if a physical item is received via an acceptor, establishing a credit balance based, at least in part, on a monetary value associated with the received physical item;
(b) after establishing the credit balance based, at least in part, on the monetary value associated with the received physical item, causing at least one processor to execute a plurality of instructions to, for a play of a game:
(i) display a plurality of symbol displays, each symbol display having a plurality of different symbol sets, each different symbol set including a different plurality of symbols and extending along a different circumferential path of the symbol display, and each symbol display configured to spin in a plurality of different directions, each different direction corresponding to a different one of the circumferential paths;
(ii) for one of the plurality of symbol displays, receive an input of a selected one of the plurality of different directions corresponding to the circumferential paths;
(iii) cause each of the symbol displays to spin in the selected direction;
(iv) cause each of the symbol displays to stop spinning;
(v) for each symbol display, display at least one of the symbols of the symbol set extending along the circumferential path of said symbol display which corresponds to the spun direction of said symbol display;
(vi) evaluate the displayed symbols for any winning symbol combinations; and
(vii) if any winning symbol combinations are displayed by the symbol displays, provide any awards associated with said displayed winning symbol combinations, wherein the credit balance is increaseable based on any awards associated with said displayed winning symbol combinations; and
(c) if a cashout input is received via a cashout device, causing an initiation of a payout associated with the credit balance.

9. The method of claim 8, wherein each symbol set of each symbol display includes a different distribution of symbols selected from a same group of symbols.

10. The method of claim 9, which includes receiving an individual selection of one of the plurality of different directions for each symbol display.

11. The method of claim 8, wherein at least one symbol set includes symbols selected from one of a plurality of different groups of symbols.

12. The method of claim 11, wherein at least one symbol display includes symbol sets having at least one overlapping symbol, wherein the at least one overlapping symbol is included in a plurality of said symbol sets.

13. The method of claim 12, wherein the at least one overlapping symbol is a wild symbol.

14. The method of claim 8, wherein at least one of the symbol displays includes an electro-mechanical symbol display.

15. A non-transitory computer readable medium including a plurality of instructions, which when executed by at least one processor, causes the at least one processor to operate with at least one display device and at least one input device to:
(a) if a physical item is received via an acceptor, establish a credit balance based, at least in part, on a monetary value associated with the received physical item;
(b) after establishing the credit balance based, at least in part, on the monetary value indicated by the received physical item, for a play of a game:
(i) display a plurality of symbol displays, each symbol display having a plurality of different symbol sets, each different symbol set including a different plurality of symbols and extending along a different circumferential path of the symbol display, and each symbol display configured to spin in a plurality of different directions, each different direction corresponding to a different one of the circumferential paths;

(ii) for one of the plurality of symbol displays, receive an input of a selected one of the plurality of different directions corresponding to the circumferential paths;

(iii) cause each of the symbol displays to spin in the selected direction;

(iv) cause each of the symbol displays to stop spinning;

(v) for each symbol display, display at least one of the symbols of the symbol set extending along the circumferential path of said symbol display which corresponds to the spun direction of said symbol display;

(vi) evaluate the displayed symbols for any winning symbol combinations; and (vii) if any winning symbol combinations are displayed by the symbol displays, provide any awards associated with said displayed winning symbol combinations, wherein the credit balance is increasable based on any awards associated with said displayed winning symbol combinations; and (c) if a cashout input is received via a cashout device, cause an initiation of a payout associated with the credit balance.

16. The non-transitory computer readable medium of claim 15, wherein each symbol set of each symbol display includes a different distribution of symbols selected from a same group of symbols.

17. The non-transitory computer readable medium of claim 16, wherein when executed by the at least one processor, the plurality of instructions cause the at least one processor to receive an individual selection of one of the plurality of different directions for each symbol display.

18. The non-transitory computer readable medium of claim 15, wherein at least one symbol set includes symbols selected from one of a plurality of different groups of symbols.

19. The non-transitory computer readable medium of claim 18, wherein at least one symbol display includes symbol sets having at least one overlapping symbol, wherein the at least one overlapping symbol is included in a plurality of said symbol sets.

20. The non-transitory computer readable medium of claim 19, wherein the at least one overlapping symbol is a wild symbol.

21. The non-transitory computer readable medium of claim 15, wherein at least one of the symbol displays includes an electro-mechanical symbol display.

* * * * *